US011950194B2

(12) United States Patent
Su et al.

(10) Patent No.: US 11,950,194 B2
(45) Date of Patent: Apr. 2, 2024

(54) COMMUNICATION METHOD AND DEVICE

(71) Applicant: HUAWEI TECHNOLOGIES CO., LTD., Guangdong (CN)

(72) Inventors: Liyan Su, Beijing (CN); Chaojun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 394 days.

(21) Appl. No.: 17/480,590

(22) Filed: Sep. 21, 2021

(65) Prior Publication Data
US 2022/0007315 A1 Jan. 6, 2022

Related U.S. Application Data

(63) Continuation of application No. PCT/CN2020/075145, filed on Feb. 13, 2020.

(30) Foreign Application Priority Data

Mar. 21, 2019 (CN) .......................... 201910217449.6

(51) Int. Cl.
H04W 56/00 (2009.01)
H04W 72/044 (2023.01)
H04W 72/30 (2023.01)

(52) U.S. Cl.
CPC ....... *H04W 56/001* (2013.01); *H04W 72/044* (2013.01); *H04W 72/30* (2023.01)

(58) Field of Classification Search
CPC . H04W 56/001; H04W 72/044; H04W 72/30; H04W 24/02; H04W 48/10;
(Continued)

(56) References Cited

U.S. PATENT DOCUMENTS 10,764,851 B2 * 9/2020 Kerhuel ................ H04L 5/0064
11,303,494 B2 * 4/2022 Atungsiri ............ H04L 27/2692
(Continued)

FOREIGN PATENT DOCUMENTS

CN 107734596 A 2/2018
CN 108235435 A 6/2018
(Continued)

OTHER PUBLICATIONS

Ericsson, "Acquisition of Minimum SI," 3GPP TSG-RAN WG2 NR Ad Hoc, R2-1700477, Spokane, USA, Jan. 17-19, 2017, 8 pages.
(Continued)

*Primary Examiner* — Christopher M Brandt
(74) *Attorney, Agent, or Firm* — Fish & Richardson P.C.

(57) ABSTRACT

Example communication methods and apparatus are described. One example communication method includes generating a synchronization signal block (SSB) by an access network device, where the SSB includes a first physical broadcast channel (PBCH) and a second PBCH. The first PBCH carries time-frequency resource position information of first synchronization information, the second PBCH carries time-frequency resource position information of second synchronization information, and a time-frequency resource position of the first synchronization information is different from a time-frequency resource position of the second synchronization information. The access network device broadcasts the SSB. In embodiments of this application, the SSB may carry PBCHs corresponding to terminal devices of different bandwidth types and/or synchronization information of the terminal devices of different bandwidth types to satisfy processing requirements of the terminal devices of a plurality of bandwidth types.

20 Claims, 12 Drawing Sheets

(58) Field of Classification Search
CPC ..... H04W 56/00; H04W 72/04; H04W 48/12; H04W 72/0446; H04W 72/0453; H04L 5/005; H04L 5/0053; H04L 5/0094
See application file for complete search history.

(56) References Cited

U.S. PATENT DOCUMENTS

| | | | |
|---|---|---|---|
| 2018/0184391 A1 | 6/2018 | Ly et al. | |
| 2018/0234931 A1* | 8/2018 | Ly | H04W 72/30 |
| 2018/0324623 A1 | 11/2018 | Jung et al. | |

FOREIGN PATENT DOCUMENTS

| | | |
|---|---|---|
| CN | 108282317 A | 7/2018 |
| CN | 108366029 A | 8/2018 |
| CN | 109150448 A | 1/2019 |
| WO | 2018171924 A1 | 9/2018 |
| WO | 2018204665 A1 | 11/2018 |
| WO | 2018231003 A1 | 12/2018 |

OTHER PUBLICATIONS

Office Action issued in Chinese Application No. 201910217449.6 dated Apr. 25, 2021, 17 pages (with English translation).
PCT International Search Report and Written Opinion issued in International Application No. PCT/CN2020/075145 dated Apr. 30, 2020, 15 pages (with English translation).
Extended European Search Report issued in European Application No. 20773841.0 dated Mar. 31, 2022, 12 pages.
Huawei, HiSilicon, "Sidelink synchronization mechanisms for NR V2X," 3GPP TSG RAN WG1 Meeting #95, R1-1812208, Spokane, USA, Nov. 12-16, 2018, 6 pages.
Sony, "RRM Measurements for UE supporting Wideband CC," 3GPP TSG RAN WG1 Meeting #91, R1-1720455, Reno, USA, Nov. 27-Dec. 1, 2017, 4 pages.
Office Action issued in Chinese Application No. CN dated Feb. 7, 2022, 6 pages (with English translation).

* cited by examiner

COMMUNICATION METHOD AND DEVICE

CROSS-REFERENCE TO RELATED APPLICATIONS

This application is a continuation of International Application No. PCT/CN2020/075145, filed on Feb. 13, 2020, which claims priority to Chinese Patent Application No. 201910217449.6, filed on Mar. 21, 2019. The disclosures of the aforementioned applications are hereby incorporated by reference in their entireties.

TECHNICAL FIELD

This application relates to the field of communication technologies, and in particular, to a communication method and a device.

BACKGROUND

A $5^{th}$ generation (5G) mobile communication technology new radio (new radio, NR) system is a global 5G standard that is designed based on orthogonal frequency division multiplexing (OFDM) new radio, and is also a foundation of a very important next-generation cellular mobile technology. In the NR system, a synchronization signal is transmitted in a basic unit of a synchronization signal block (SSB). The SSB includes a primary synchronization signal (PSS) and a secondary synchronization signal (SSS). Optionally, the SSB may further include a physical broadcast channel (PBCH).

Currently, bandwidths of the PSS, the SSS, and the PBCH each occupy six resource blocks (RB). With the development of the NR system, terminal devices of a plurality of bandwidth types are introduced. The different bandwidth types herein refer to different operating bandwidths. For example, there is a terminal device whose operating bandwidth is 12 RBs (which is also referred to as a 12-RB terminal device for short in the following), a terminal device whose operating bandwidth is six RBs (which is also referred to as a six-RB terminal device for short in the following), a terminal device whose operating bandwidth is one RB (which is also referred to as a one-RB terminal device for short in the following), and the like. For example, the 12-RB terminal device is a broadband terminal device relative to the six-RB terminal device and the one-RB terminal device. The six-RB terminal device is a narrowband terminal device relative to the 12-RB terminal device, but is a broadband terminal device relative to the one-RB terminal device. To ensure that the terminal devices of various bandwidth types can receive the SSB, currently, corresponding SSBs are respectively designed for the terminal devices of various bandwidth types.

Some information, for example, a cell (identity, ID) and a system frame number (SFN), carried in the SSBs corresponding to the terminal devices of different bandwidth types is usually the same. According to the current manner, the SSBs corresponding to the terminal devices of various bandwidth types are respectively sent to the terminal devices. As a result, the same information such as the cell ID and the SFN is repeatedly sent, and a relatively large amount of transmission resources need to be occupied.

SUMMARY

This application provides a communication method and a device, to reduce transmission resources occupied when an SSB is sent.

According to a first aspect, an embodiment of this application provides a first communication method. The method includes: An access network device generates an SSB, where the SSB includes a first physical broadcast channel PBCH and a second PBCH, the first PBCH carries time-frequency resource position information of first synchronization information, the second PBCH carries time-frequency resource position information of second synchronization information, and a time-frequency resource position of the first synchronization information is different from a time-frequency resource position of the second synchronization information; and the access network device broadcasts the SSB.

The communication method may be performed by a first communication apparatus. The first communication apparatus may be the access network device or a communication apparatus that can support the access network device in implementing a function required by the communication method. Certainly, the first communication apparatus may alternatively be another communication apparatus, for example, a chip system. An example in which the first communication apparatus is the access network device is used herein, that is, the communication method is described from a perspective of the access network device.

In this embodiment of this application, the SSB includes the first PBCH that carries the time-frequency resource position information of the first synchronization information and the second PBCH that carries the time-frequency resource position information of the second synchronization information. The first synchronization information may be used by a terminal device of one bandwidth type to perform downlink synchronization, and the second synchronization information may be used by a terminal device of another bandwidth type to perform downlink synchronization. In this way, the SSB may carry PBCHs separately corresponding to terminal devices that belong to different bandwidth types, and carry common synchronization information of the terminal devices of different bandwidth types, for example, information such as a cell ID and an SFN. Therefore, for the terminal devices of different bandwidth types, an access network needs to send only the same SSB, and the information such as the cell ID and the SFN in the SSB needs to be sent only once. Compared with a conventional technology in which SSBs corresponding to the terminal devices of various bandwidth types are separately designed and sent to the terminal devices of various bandwidth types, and consequently the information such as the cell ID and the SFN is repeatedly sent, the SSB provided in this embodiment of this application can satisfy the terminal devices of various bandwidth types, and further reduce transmission resources occupied for sending the information such as the cell ID and the SFN.

With reference to the first aspect, in a possible implementation of the first aspect, the first PBCH may further carry third synchronization information, the time-frequency resource position information of the first synchronization information and the third synchronization information are used by a first-type terminal device to perform downlink synchronization, and the time-frequency resource position information of the second synchronization information and the third synchronization information are used by a second-type terminal device to perform downlink synchronization.

In this embodiment of this application, the first PBCH may further carry the third synchronization information, for example, an SFN in a master information block (Master Information Block, MIB), to use the third synchronization information as common information used by the terminal devices of different bandwidth types to perform downlink synchronization. In this way, the PBCHs do not need to be separately designed for the terminal devices of different bandwidth types. In addition, because a quantity of bits carried on a PBCH that carries only the third synchronization information is less than a quantity of bits carried on the PBCHs separately for the terminal devices of different bandwidth types, transmission resources can be reduced.

With reference to the first aspect, in a possible implementation of the first aspect, the first synchronization information is a first system information block type 1 SIB1, and the second synchronization information is a second SIB1. The time-frequency resource position information that is carried on the second PBCH and that is of the second synchronization information is position information of the second SIB1 and/or a carrier resource block CRB offset, and the CRB offset is used to indicate the position information of the second SIB1.

In this embodiment of this application, the time-frequency resource position information that is carried on the second PBCH and that is of the second synchronization information may indicate the position information of the second SIB1. For example, the time-frequency resource position information of the second synchronization information may include the position information of the second SIB1 and/or the carrier resource block (Carry Resource Block, CRB) offset. The CRB offset may be considered as a difference between a frequency domain resource of the second SIB1 and a frequency domain resource of the SSB, to indicate a position at which a terminal device obtains the second SIB1. The second PBCH provided in this embodiment of this application may be used to reconfigure the position information of the second SIB1 for the second-type terminal device, to correspond to a bandwidth receiving capability of the second-type terminal device, so that the second-type terminal device can receive the second SIB1.

With reference to the first aspect, in a possible implementation of the first aspect, the first SIB1 and the second SIB1 include same or different information.

A terminal device may perform a subsequent procedure such as a random access procedure based on information included in an SIB1, for example, a bandwidth and a cell access parameter. When the access network device does not need to distinguish between terminal device types, SIB1s including same information may be configured for the terminal devices of different bandwidth types, to reduce load of the access network device. For the terminal devices of different bandwidth types, the access network device may alternatively configure SIBs including different information. In this way, the terminal devices of different bandwidth types need to parse only information about SIB1s respectively corresponding to the terminal devices, but do not need to parse all SIB1s, thereby reducing workload of the terminal devices.

With reference to the first aspect, in a possible implementation of the first aspect, the SSB may further include a third PBCH.

A frequency domain resource of the first PBCH is a first frequency domain resource, a frequency domain resource of the third PBCH is a third frequency domain resource, and the first frequency domain resource includes a second frequency domain resource and the third frequency domain resource.

Information carried on the third PBCH is the same as information carried on the first PBCH on the second frequency domain resource, or a signal carried on the third PBCH is the same as a signal carried on the first PBCH on the second frequency domain resource.

In this embodiment of this application, the SSB may further include a third PBCH. A frequency domain resource of the third PBCH may include a frequency domain resource of the first PBCH and a second frequency domain resource. In this case, PBCHs of the terminal devices of different bandwidth types may be nested on frequency domain resources. For example, the third PBCH belongs to the second-type terminal device, and the first PBCH belongs to the first-type terminal device. To enable the second-type terminal device to use an SSB of the first-type terminal device as much as possible, the SSB may nest the frequency domain resource occupied by the third PBCH in the frequency domain resource occupied by the first PBCH, for example, nest the frequency domain resource occupied by the third PBCH in the second frequency domain resource. In this way, the second-type terminal device can correctly demodulate the SSB of the first-type terminal device, but the first-type terminal device cannot sense the third PBCH extra involved for the second-type terminal device, so that the downlink synchronization of the first-type terminal device and the downlink synchronization of the second-type terminal device can be simultaneously satisfied.

In a possible implementation, the frequency domain resource of the third PBCH is a proper subset of the frequency domain resource of the first PBCH, and the information carried on the third PBCH is information on a frequency domain resource that is other than a frequency domain resource of the second PBCH and that is in the frequency domain resource of the first PBCH.

Alternatively, the signal carried on the third PBCH is a signal on a frequency domain resource that is other than a frequency domain resource of the second PBCH and that is in the frequency domain resource of the first PBCH.

In a possible implementation, the SSB may further include a fourth PBCH. The fourth PBCH is used by a third-type terminal device to change a part of information included in the first PBCH. A maximum bandwidth supported by the third-type terminal device is greater than or equal to a maximum bandwidth supported by the first-type terminal device.

In a possible implementation, a frequency domain resource of the fourth PBCH is located in the frequency domain resource of the first PBCH. In other words, the frequency domain resource of the fourth PBCH is a subset of the frequency domain resource of the first PBCH.

In a possible implementation, the frequency domain resource of the fourth PBCH is located outside the frequency domain resource of the first PBCH.

Considering that a terminal device with a wider operating bandwidth may perform synchronization by using an SSB of a terminal device with a narrower operating bandwidth, but performance of synchronization performed based on the terminal device with the narrower operating bandwidth is relatively poor, the SSB provided in this embodiment of this application may further include the fourth PBCH. The third-type terminal device may change a part of the information on the first PBCH based on the fourth PBCH, for example, position information of an SIB1. In this way, the third-type terminal device may determine synchronization information, such as MIB information, of the third-type terminal device based on the first PBCH and the fourth PBCH, to enhance synchronization performance of the third-type terminal device.

With reference to the first aspect, in a possible implementation of the first aspect, when broadcasting the SSB, the access network device may specifically broadcast the SSB on same frequency domain resources within at least one time window.

In this embodiment of this application, the SSB is located in one time window, and a time domain and/or a frequency domain structure of the SSB is configured by the access network device. In this case, the access network device may broadcast the SSB within the at least one time window on a frequency domain resource corresponding to a minimum bandwidth of a terminal device with a wider operating bandwidth, so that a terminal device with a narrower operating bandwidth can receive the SSB, thereby ensuring receiving accuracy of the SSB as much as possible.

With reference to the first aspect, in a possible implementation of the first aspect, a maximum bandwidth supported by the second-type terminal device is less than or equal to the maximum bandwidth supported by the first-type terminal device.

In this embodiment of this application, the first-type terminal device may be a terminal device with a wider operating bandwidth, and the second-type terminal device is a terminal device with a narrower operating bandwidth. The PBCHs included in the SSB may be obtained by nesting a PBCH of the first-type terminal device and a PBCH of the second-type terminal device, to avoid a system resource waste caused by separate design of the PBCHs of the terminal devices of different bandwidth types.

According to a second aspect, an embodiment of this application provides a second communication method. The method includes: A terminal device receives a first signal, where the first signal includes a physical broadcast channel PBCH; and the terminal device obtains the PBCH. The PBCH is located in a synchronization signal block SSB, the SSB includes a first PBCH and a second PBCH, the first PBCH carries time-frequency resource position information of first synchronization information, the second PBCH carries time-frequency resource position information of second synchronization information, and a time-frequency resource position of the first synchronization information is different from a time-frequency resource position of the second synchronization information. The obtained PBCH is the first PBCH or the second PBCH.

The communication method may be performed by a second communication apparatus. The second communication apparatus may be the terminal device or a communication apparatus that can support the terminal device in implementing a function required by the communication method. Certainly, the second communication apparatus may alternatively be another communication apparatus, for example, a chip system. An example in which the second communication apparatus is the terminal device is used herein, that is, the communication method is described from a perspective of the terminal device.

With reference to the second aspect, in a possible implementation of the second aspect, the first PBCH may further carry third synchronization information, and the terminal device may further obtain the third synchronization information on the first PBCH, and further perform synchronization processing based on the third synchronization information and the obtained PBCH.

With reference to the second aspect, in a possible implementation of the second aspect, when the obtained PBCH is the first PBCH, the terminal device is a first-type terminal device; and when the obtained PBCH is the second PBCH, the terminal device is a second-type terminal device. A maximum bandwidth of the second-type terminal device is less than or equal to a maximum bandwidth of the first-type terminal device.

With reference to the second aspect, in a possible implementation of the second aspect, the first synchronization information is a first SIB1, and the second synchronization information is a second SIB1. The time-frequency resource position information that is carried on the second PBCH and that is of the second synchronization information is position information of the second SIB1 and/or a CRB offset, and the CRB offset is used to indicate the position information of the second SIB1.

With reference to the second aspect, in a possible implementation of the second aspect, the first SIB1 and the second SIB1 include same or different information.

With reference to the second aspect, in a possible implementation of the second aspect, the SSB further includes a third PBCH. A frequency domain resource of the first PBCH is a first frequency domain resource, a frequency domain resource of the third PBCH is a third frequency domain resource, and the first frequency domain resource includes a second frequency domain resource and the third frequency domain resource. Information carried on the third PBCH is the same as information carried on the first PBCH on the second frequency domain resource, or a signal carded on the third PBCH is the same as a signal carried on the first PBCH on the second frequency domain resource.

In a possible implementation, the frequency domain resource of the third PBCH is a proper subset of the frequency domain resource of the first PBCH, and the information carried on the third PBCH is information on a frequency domain resource that is other than a frequency domain resource of the second PBCH and that is in the frequency domain resource of the first PBCH.

Alternatively, the signal carried on the third PBCH is a signal on a frequency domain resource that is other than a frequency domain resource of the second PBCH and that is in the frequency domain resource of the first PBCH.

In a possible implementation, the SSB may further include a fourth PBCH. The fourth PBCH is used by a third-type terminal device to change a part of information included in the first PBCH. A maximum bandwidth supported by the third-type terminal device is greater than or equal to a maximum bandwidth supported by the first-type terminal device.

In a possible implementation, a frequency domain resource of the fourth PBCH is located in the frequency domain resource of the first PBCH.

In a possible implementation, the frequency domain resource of the fourth PBCH is located outside the frequency domain resource of the first PBCH.

In this embodiment of this application, one SSB may further include the fourth PBCH. The fourth PBCH is received by the third-type terminal device, namely, a broadband terminal device, and is used to change a part of information on the first PBCH, for example, position information of an SIB1. In this way, the first-type terminal device determines MIB information of the first-type terminal device based on the first PBCH, the third-type terminal device determines MIB information of the third-type terminal device based on the first PBCH and the fourth PBCH, and the fourth PBCH may be used to modify a part of the information on the first PBCH, to enhance synchronization performance of the third-type terminal device.

With reference to the second aspect, in a possible implementation of the second aspect, when receiving the first signal, the terminal device may specifically receive the first signal within at least one time window.

According to a third aspect, a first-type communication apparatus is provided. For example, the communication apparatus is the first communication apparatus described above. The communication apparatus is configured to perform the method according to any one of the first aspect or the possible implementations of the first aspect. Specifically, the communication apparatus may include modules configured to perform the method according to any one of the first aspect or the possible implementations of the first aspect, for example, include a processing module and a transceiver module that are coupled to each other. For example, the communication apparatus may be an access network device.

The processing module is configured to generate a synchronization signal block SSB, where the SSB includes a first physical broadcast channel PBCH and a second PBCH, the first PBCH carries time-frequency resource position information of first synchronization information, the second PBCH carries time-frequency resource position information of second synchronization information, and a time-frequency resource position of the first synchronization information is different from a time-frequency resource position of the second synchronization information.

The transceiver module is configured to broadcast the SSB.

With reference to the third aspect, in a possible implementation of the third aspect, the first PBCH carries third synchronization information, the time-frequency resource position information of the first synchronization information and the third synchronization information are used by a first-type terminal device to perform downlink synchronization, and the time-frequency resource position information of the second synchronization information and the third synchronization information are used by a second-type terminal device to perform downlink synchronization.

With reference to the third aspect, in a possible implementation of the third aspect, the first synchronization information is a first system information block type 1 SIB1, and the second synchronization information is a second SIB1.

The time-frequency resource position information that is carried on the second PBCH and that is of the second synchronization information is position information of the second SIB1 and/or a carrier resource block CRB offset, and the CRB offset is used to indicate the position information of the second SIB1.

With reference to the third aspect, in a possible implementation of the third aspect, the first SIB1 and the second SIB1 include same or different information.

With reference to the third aspect, in a possible implementation of the third aspect, the SSB further includes a third PBCH.

A frequency domain resource of the first PBCH is a first frequency domain resource, a frequency domain resource of the third PBCH is a third frequency domain resource, and the first frequency domain resource includes a second frequency domain resource and the third frequency domain resource.

Information carried on the third PBCH is the same as information carried on the first PBCH on the second frequency domain resource, or a signal carried on the third PBCH is the same as a signal carried on the first PBCH on the second frequency domain resource.

In a possible implementation, the frequency domain resource of the third PBCH is a proper subset of the frequency domain resource of the first PBCH.

The information carried on the third PBCH is information on a frequency domain resource that is other than a frequency domain resource of the second PBCH and that is in the frequency domain resource of the first PBCH.

Alternatively, the signal carried on the third PBCH is a signal on a frequency domain resource that is other than a frequency domain resource of the second PBCH and that is in the frequency domain resource of the first PBCH.

In a possible implementation, the SSB may further include a fourth PBCH. The fourth PBCH is used by a third-type terminal device to change a part of information included in the first PBCH. A maximum bandwidth supported by the third-type terminal device is greater than or equal to a maximum bandwidth supported by the first-type terminal device.

In a possible implementation, a frequency domain resource of the fourth PBCH is located in the frequency domain resource of the first PBCH.

In a possible implementation, the frequency domain resource of the fourth PBCH is located outside the frequency domain resource of the first PBCH.

With reference to the third aspect, in a possible implementation of the third aspect, the transceiver module is specifically configured to broadcast the SSB on same frequency domain resources within at least one time window.

With reference to the third aspect, in a possible implementation of the third aspect, a maximum bandwidth supported by the second-type terminal device is less than or equal to the maximum bandwidth supported by the first-type terminal device.

For technical effects achieved by the third aspect or the possible implementations of the third aspect, refer to descriptions of technical effects of the first aspect or the possible implementations of the first aspect.

According to a fourth aspect, a second-type communication apparatus is provided. For example, the communication apparatus is the second communication apparatus described above. The communication apparatus is configured to perform the method according to any one of the second aspect or the possible implementations of the second aspect. Specifically, the communication apparatus may include modules configured to perform the method according to any one of the second aspect or the possible implementations of the second aspect, for example, include a processing module and a transceiver module that are coupled to each other. For example, the communication apparatus is a terminal device.

The transceiver module is configured to receive a first signal, where the first signal includes a physical broadcast channel PBCH.

The processing module is configured to obtain the PBCH.

The PBCH is located in a synchronization signal block SSB, the SSB includes a first PBCH and a second PBCH, the first PBCH carries time-frequency resource position information of first synchronization information, the second PBCH carries time-frequency resource position information of second synchronization information, and a time-frequency resource position of the first synchronization information is different from a time-frequency resource position of the second synchronization information. The obtained PBCH is the first PBCH or the second PBCH.

With reference to the fourth aspect, in a possible implementation of the fourth aspect, the first PBCH carries third synchronization information, and the processing module is further configured to obtain the third synchronization information on the first PBCH, and perform synchronization processing based on the third synchronization information and the obtained PBCH.

With reference to the fourth aspect, in a possible implementation of the fourth aspect, when the obtained PBCH is the first PBCH, the terminal device is a first-type terminal device.

When the obtained PBCH is the second PBCH, the terminal device is a second-type terminal device.

A maximum bandwidth supported by the second-type terminal device is less than or equal to a maximum bandwidth supported by the first-type terminal device.

With reference to the fourth aspect, in a possible implementation of the fourth aspect, the first synchronization information is a first SIB1, and the second synchronization information is a second SIB1.

The time-frequency resource position information that is carried on the second PBCH and that is of the second synchronization information is position information of the second SIB1 and/or a CRB offset, and the CRB offset is used to indicate the position information of the second SIB1.

With reference to the fourth aspect, in a possible implementation of the fourth aspect, the first SIB1 and the second SIB1 include same or different information.

With reference to the fourth aspect, in a possible implementation of the fourth aspect, the SSB further includes a third PBCH.

A frequency domain resource of the first PBCH is a first frequency domain resource, a frequency domain resource of the third PBCH is a third frequency domain resource, and the first frequency domain resource includes a second frequency domain resource and the third frequency domain resource.

Information carried on the third PBCH is the same as information carried on the first PBCH on the second frequency domain resource, a signal carried on the third PBCH is the same as a signal carried on the first PBCH on the second frequency domain resource.

In a possible implementation, the frequency domain resource of the third PBCH is a proper subset of the frequency domain resource of the first PBCH.

The information carried on the third PBCH is information on a frequency domain resource that is other than a frequency domain resource of the second PBCH and that is in the frequency domain resource of the first PBCH.

Alternatively, the signal carried on the third PBCH is a signal on a frequency domain resource that is other than a frequency domain resource of the second PBCH and that is in the frequency domain resource of the first PBCH.

In a possible implementation, the SSB may further include a fourth PBCH. The fourth PBCH is used by a third-type terminal device to change a part of information included in the first PBCH. A maximum bandwidth supported by the third-type terminal device is greater than or equal to the maximum bandwidth supported by the first-type terminal device.

In a possible implementation, a frequency domain resource of the fourth PBCH is located in the frequency domain resource of the first PBCH.

In a possible implementation, the frequency domain resource of the fourth PBCH is located outside the frequency domain resource of the first PBCH.

With reference to the fourth aspect, in a possible implementation of the fourth aspect, the transceiver module is specifically configured to receive the first signal within at least one time window.

For technical effects achieved by the fourth aspect or the possible implementations of the fourth aspect, refer to descriptions of technical effects of the second aspect or the possible implementations of the second aspect.

According to a fifth aspect, a third-type communication apparatus is provided. For example, the communication apparatus is the first communication apparatus described above. The communication apparatus includes a processor and a transceiver, and is configured to implement the method according to any one of the first aspect or the possible designs of the first aspect. For example, the communication apparatus is a chip disposed in a communication device. For example, the communication device is an access network device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component.

The processor is configured to generate a synchronization signal block SSB, where the SSB includes a first physical broadcast channel PBCH and a second PBCH, the first PBCH carries time-frequency resource position information of first synchronization information, the second PBCH carries time-frequency resource position information of second synchronization information, and a time-frequency resource position of the first synchronization information is different from a time-frequency resource position of the second synchronization information.

The transceiver is configured to broadcast the SSB.

With reference to the fifth aspect, in a possible implementation of the fifth aspect, the first PBCH carries third synchronization information, the time-frequency resource position information of the first synchronization information and the third synchronization information are used by a first-type terminal device to perform downlink synchronization, and the time-frequency resource position information of the second synchronization information and the third synchronization information are used by a second-type terminal device to perform downlink synchronization.

With reference to the fifth aspect, in a possible implementation of the fifth aspect, the first synchronization information is a first system information block type 1 SIB1, and the second synchronization information is a second SIB1.

The time-frequency resource position information that is carried on the second PBCH and that is of the second synchronization information is position information of the second SIB1 and/or a carrier resource block CRB offset, and the CRB offset is used to indicate the position information of the second SIB1.

With reference to the fifth aspect, in a possible implementation of the fifth aspect, the first SIB1 and the second SIB1 include same or different information.

With reference to the fifth aspect, in a possible implementation of the fifth aspect, the SSB further includes a third PBCH.

A frequency domain resource of the first PBCH is a first frequency domain resource, a frequency domain resource of the third PBCH is a third frequency domain resource, and the first frequency domain resource includes a second frequency domain resource and the third frequency domain resource.

Information carried on the third PBCH is the same as information carried on the first PBCH on the second frequency domain resource, and a signal carried on the third PBCH is the same as a signal carried on the first PBCH on the second frequency domain resource.

In a possible implementation, the frequency domain resource of the third PBCH is a proper subset of the frequency domain resource of the first PBCH.

The information carried on the third PBCH is information on a frequency domain resource that is other than a frequency domain resource of the second PBCH and that is in the frequency domain resource of the first PBCH.

Alternatively, the signal carried on the third PBCH is a signal on a frequency domain resource that is other than a frequency domain resource of the second PBCH and that is in the frequency domain resource of the first PBCH.

In a possible implementation, the SSB may further include a fourth PBCH. The fourth PBCH is used by a third-type terminal device to change a part of information included on the first PBCH. A maximum bandwidth supported by the third-type terminal device is greater than or equal to a maximum bandwidth supported by the first-type terminal device.

In a possible implementation, a frequency domain resource of the fourth PBCH is located in the frequency domain resource of the first PBCH.

In a possible implementation, the frequency domain resource of the fourth PBCH is located outside the frequency domain resource of the first PBCH.

With reference to the fifth aspect, in a possible implementation of the fifth aspect, the transceiver is specifically configured to broadcast the SSB on same frequency domain resources within at least one time window.

With reference to the fifth aspect, in a possible implementation of the fifth aspect, a maximum bandwidth supported by the second-type terminal device is less than or equal to the maximum bandwidth supported by the first-type terminal device.

For technical effects achieved by the fifth aspect or the possible implementations of the fifth aspect, refer to descriptions of technical effects of the first aspect or the possible implementations of the first aspect.

According to a sixth aspect, a fourth-type communication apparatus is provided. For example, the communication apparatus is the second communication apparatus described above. The communication apparatus includes a processor and a transceiver, and is configured to implement the method according to any one of the second aspect or the possible designs of the second aspect. For example, the communication apparatus is a chip disposed in a communication device. For example, the communication device is a terminal device. For example, the transceiver is implemented by using an antenna, a feeder, and a codec in the communication device. Alternatively, if the communication apparatus is the chip disposed in the communication device, the transceiver is, for example, a communication interface in the chip. The communication interface is connected to a radio frequency transceiver component in the communication device, to receive and send information by using the radio frequency transceiver component.

The transceiver is configured to receive a first signal, where the first signal includes a physical broadcast channel PBCH.

The processor is configured to obtain the PBCH.

The PBCH is located in a synchronization signal block SSB, the SSB includes a first PBCH and a second PBCH, the first PBCH carries time-frequency resource position information of first synchronization information, the second PBCH carries time-frequency resource position information of second synchronization information, and a time-frequency resource position of the first synchronization information is different from a time-frequency resource position of the second synchronization information. The obtained PBCH is the first PBCH or the second PBCH.

With reference to the sixth aspect, in a possible implementation of the sixth aspect, the first PBCH carries third synchronization information, and the processor is further configured to obtain the third synchronization information on the first PBCH, and perform synchronization processing based on the third synchronization information and the obtained PBCH.

With reference to the sixth aspect, in a possible implementation of the sixth aspect, when the obtained PBCH is the first PBCH, the terminal device is a first-type terminal device.

When the obtained PBCH is the second PBCH, the terminal device is a second-type terminal device.

A maximum bandwidth supported by the second-type terminal device is less than or equal to a maximum bandwidth supported by the first-type terminal device.

With reference to the sixth aspect, in a possible implementation of the sixth aspect, the first synchronization information is a first SIB1, and the second synchronization information is a second SIB1.

The time-frequency resource position information that is carried on the second PBCH and that is of the second synchronization information is position information of the second SIB1 and/or a CRB offset, and the CRB offset is used to indicate the position information of the second SIB1.

With reference to the sixth aspect, in a possible implementation of the sixth aspect, the first SIB1 and the second SIB1 include same or different information.

With reference to the sixth aspect, in a possible implementation of the sixth aspect, the SSB further includes a third PBCH.

A frequency domain resource of the first PBCH is a first frequency domain resource, a frequency domain resource of the third PBCH is a third frequency domain resource, and the first frequency domain resource includes a second frequency domain resource and the third frequency domain resource.

Information carried on the third PBCH is the same as information carried on the first PBCH on the second frequency domain resource, and a signal carried on the third PBCH is the same as a signal carried on the first PBCH on the second frequency domain resource.

In a possible implementation, the frequency domain resource of the third PBCH is a proper subset of the frequency domain resource of the first PBCH.

The information carried on the third PBCH is information on a frequency domain resource that is other than a frequency domain resource of the second PBCH and that is in the frequency domain resource of the first PBCH.

Alternatively, the signal carried on the third PBCH is a signal on a frequency domain resource that is other than a frequency domain resource of the second PBCH and that is in the frequency domain resource of the first PBCH.

In a possible implementation, the SSB may further include a fourth PBCH. The fourth PBCH is used by a third-type terminal device to change a part of information included on the first PBCH. A maximum bandwidth supported by the third-type terminal device is greater than or equal to the maximum bandwidth supported by the first-type terminal device.

In a possible implementation, a frequency domain resource of the fourth PBCH is located in the frequency domain resource of the first PBCH.

In a possible implementation, the frequency domain resource of the fourth PBCH is located outside the frequency domain resource of the first PBCH.

With reference to the sixth aspect, in a possible implementation of the sixth aspect, the transceiver is specifically configured to receive the first signal within at least one time window.

For technical effects achieved by the sixth aspect or the possible implementations of the sixth aspect, refer to descriptions of technical effects of the second aspect or the possible implementations of the second aspect.

According to a seventh aspect, a fifth-type communication apparatus is provided. The communication apparatus may be the first communication apparatus in the foregoing method designs. For example, the communication apparatus is a chip disposed in a terminal device. The communication apparatus includes: a memory, configured to store computer-executable program code; and a processor, where the processor is coupled to the memory. The program code stored in the memory includes instructions, and when the processor executes the instructions, the fifth-type communication apparatus is enabled to perform the method according to any one of the first aspect or the possible implementations of the first aspect.

The fifth-type communication apparatus may further include a communication interface. The communication interface may be a transceiver in an access network device, for example, implemented by using an antenna, a feeder, and a codec in the communication apparatus. Alternatively, if the fifth-type communication apparatus is the chip disposed in the terminal device, the communication interface may be an input/output interface in the chip, for example, an input/output pin.

According to an eighth aspect, a sixth-type communication apparatus is provided. The communication apparatus may be the second communication apparatus in the foregoing method designs. For example, the communication apparatus is a chip disposed in an access network device. The communication apparatus includes: a memory, configured to store computer-executable program code; and a processor, where the processor is coupled to the memory. The program code stored in the memory includes instructions, and when the processor executes the instructions, the sixth-type communication apparatus is enabled to perform the method according to any one of the second aspect or the possible implementations of the second aspect.

The sixth-type communication apparatus may further include a communication interface. The communication interface may be a transceiver in a terminal device, for example, implemented by using an antenna, a feeder, and a codec in the communication apparatus. Alternatively, if the sixth-type communication apparatus is the chip disposed in the access network device, the communication interface may be an input/output interface in the chip, for example, an input/output pin.

According to a ninth aspect, a communication system is provided. The communication system may include the first-type communication apparatus according to the third aspect, the third-type communication apparatus according to the fifth aspect, or the fifth-type communication apparatus according to the seventh type; and the second-type communication apparatus according to the fourth aspect, the fourth-type communication apparatus according to the sixth aspect, or the sixth-type communication apparatus according to the eighth aspect.

According to a tenth aspect, a computer storage medium is provided. The computer-readable storage medium stores instructions, and when the instructions are run on a computer, the computer is enabled to perform the method according to any one of the first aspect or the possible designs of the first aspect.

According to an eleventh aspect, a computer storage medium is provided. The computer-readable storage medium stores instructions, and when the instructions are run on a computer, the computer is enabled to perform the method according to any one of the second aspect or the possible designs of the second aspect.

According to a twelfth aspect, a computer program product including instructions is provided. The computer program product stores the instructions, and when the computer program product is run on a computer, the computer is enabled to perform the method according to any one of the first aspect or the possible designs of the first aspect.

According to a thirteenth aspect, a computer program product including instructions is provided. The computer program product stores the instructions, and when the computer program product is run on a computer, the computer is enabled to perform the method according to any one of the second aspect or the possible designs of the second aspect.

In the embodiments of this application, the SSB includes the first PBCH and the second PBCH. The time-frequency resource position of the synchronization information carried on the first PBCH is different from the time-frequency resource position of the synchronization information carried on the second PBCH, so that the SSB may correspond to synchronization information required by the terminal devices of different bandwidth types. Same synchronization information required by the terminal devices of different bandwidth types, for example, information such as an SFN, may be shared. Therefore, when sending the SSB, the access network device needs to send the same information such as the SFN only once, so that on a basis that terminal devices of various bandwidth parts are satisfied, a system resource waste caused because the same information such as the SFN is repeatedly sent can further be avoided.

DESCRIPTION OF EMBODIMENTS

Figure 1:
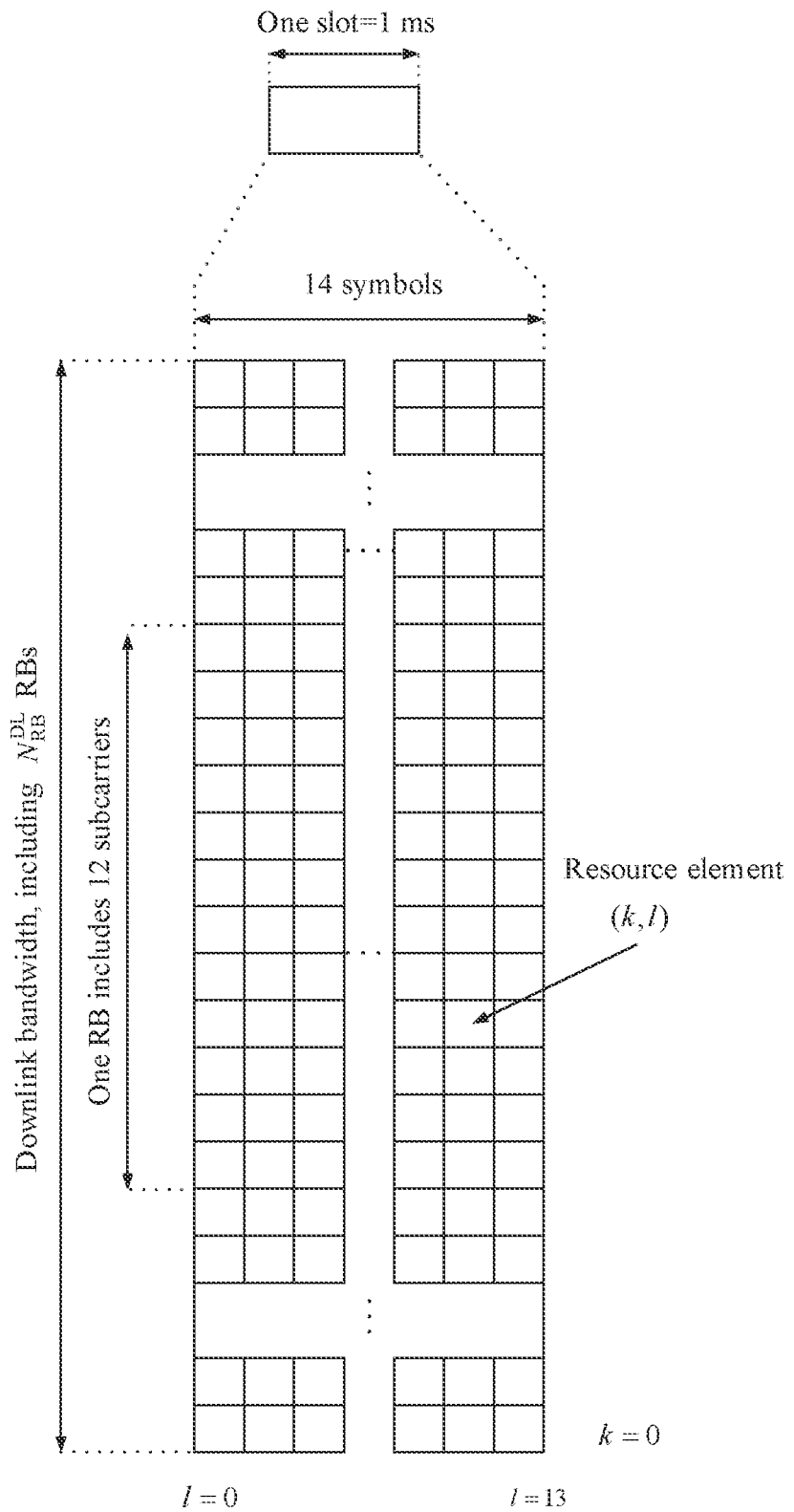
FIG. 1 is a schematic diagram of a time-frequency resource of an existing NR system.

To make objectives, technical solutions, and advantages of embodiments of this application clearer, the following further describes the embodiments of this application in detail with reference to the accompanying drawings.

For ease of understanding by a person skilled in the art, the following describes some terms in the embodiments of this application.

1. A terminal device includes a device that provides a user with voice and/or data connectivity, for example, may include a handheld device having a wireless connection function, or a processing device connected to a wireless modem. The terminal device may communicate with a core network through a radio access network (RAN) and exchange voice and/or data with the RAN. The terminal device may include user equipment (UE), a long term evolution (LTE) terminal device, a fifth generation mobile communication network (5G) terminal device, a wireless terminal device, a mobile terminal device, a device-to-device communication (D2D) terminal device, a V2X terminal device, a machine-to-machine/machine-type communication (M2M/MTC) terminal device, an Internet of things (IoT) terminal device, a subscriber unit (subscriber unit), a subscriber station (subscriber station), a mobile station (mobile station), a remote station (remote station), an access point (AP), a remote terminal (remote terminal), an access terminal (access terminal), a user terminal (user terminal), a user agent (user agent), a user device (user device), and the like. For example, the terminal device may include a mobile phone (or referred to as a "cellular" phone), a computer with a mobile terminal device, a portable, pocket-sized, handheld, or computer built-in mobile apparatus, and the like. For example, the terminal device is a device such as a personal communications service (PCS) phone, a cordless telephone set, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

By way of example, and not limitation, in the embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligently designs of daily wear, such as glasses, gloves, watches, clothes, and shoes. The wearable device is a portable device that can be directly worn by a user or integrated into clothes or an accessory of a user. The wearable device is not only a hardware device, but is used to implement powerful functions through software support, data exchange, and cloud interaction. Generalized wearable intelligent devices include full-featured and large-size devices, such as smart watches or smart glasses, that can implement complete or partial functions without depending on smartphones; and devices, such as various smart bands, smart helmets, or smart jewelry for monitoring physical signs, that focus on only one type of application functions and need to work with other devices such as smartphones.

However, if the various terminal devices described above are located in a vehicle (for example, placed in the vehicle or mounted in the vehicle), the terminal devices may be considered as vehicle-mounted terminal devices. For example, the vehicle-mounted terminal devices are also referred to as on board units (OBU).

In the embodiments of this application, the terminal device may further include a relay (relay). Alternatively, it may be understood that any device that can perform data communication with a base station may be considered as the terminal device.

The embodiments of this application may relate to two terminal devices with different maximum operating bandwidths: a first-type terminal device and a second-type terminal device. The first-type terminal device may be understood as a terminal device with a wider maximum operating bandwidth (which is also referred to as a broadband terminal device for short below), and the second-type terminal device may be understood as a terminal device with a narrower maximum operating bandwidth (which is also referred to as a narrowband terminal device for short below). Conditions that the broadband terminal device and the narrowband terminal device need to satisfy include but are not limited to the following:

(1) In the embodiments of this application, the maximum bandwidth supported by the narrowband terminal device is less than the maximum bandwidth supported by the broadband terminal device. For example, the narrowband terminal device is a narrowband Internet of Things (NB-IoT) terminal device, and the broadband terminal device is an LIE terminal device. A data transmission bandwidth of the NB-IoT terminal device is one RB, that is, 180 kHz or 200 kHz (including a guard band). Because a frequency resource occupied by a PSS/SSS in an LTE system is six RBs, that is, 1.08 MHz or 1.44 MHz (including a guard band), the maximum bandwidth supported by the broadband terminal device may be considered to be greater than or equal to 1.08 MHz. In this case, it may be considered that the maximum bandwidth supported by the narrowband terminal device is less than the maximum bandwidth supported by the broadband terminal device. For another example, the narrowband terminal device is an NB-IoT terminal device, and the broadband terminal device is an NR terminal device. Based on a design of an SSB in an NR system, a data transmission bandwidth of the NR terminal device may be considered as 20 RBs, where each RB includes 12 subcarriers. In the NR system, a subcarrier spacing is related to a frequency band deployed in the NR system, and is not a fixed value. Using a minimum subcarrier spacing of 15 kHz as an example, a maximum bandwidth supported by the NR terminal device may be considered to be greater than or equal to 20*12*15=3.6 MHz, and is greater than the maximum bandwidth supported by the narrowband terminal device.

(2) In the embodiments of this application, the narrowband terminal device may alternatively be considered as a low power wide area access (low power wide coverage access, LPWA) terminal device, and the broadband terminal device may be considered as an enhanced mobile broadband (eMBB) terminal device or an ultra-reliable low-latency communication (URLLC) terminal device.

In addition, in the embodiments of this application, one terminal device may have both a narrowband capability and a broadband capability. In other words, the terminal device may be used as both a broadband terminal device and a narrowband terminal device. For example, a six-RB terminal device is a narrowband terminal device relative to a 12-RB terminal device, and is a broadband terminal device relative to a one-RB terminal device.

2. An access network (AN) device includes, for example, a base station (for example, an access point), and may be a device that communicates with a wireless terminal device over an air interface through one or more cells in an access network. Alternatively, for example, an access network device in a V2X technology is a road side unit (RSU). The base station may be configured to mutually convert a received over-the-air frame and a received Internet protocol (IP) packet, and serve as a router between the terminal device and the other parts of the access network, where the other parts of the access network may include an IP network. The RSU may be a stationary infrastructure entity supporting application of the V2X, and may exchange a message with another entity supporting application of the V2X. The access network device may further coordinate attribute management of the air interface. For example, the access network device may include an evolved NodeB (NodeB, eNB, or e-NodeB, evolutional NodeB) in an LTE system or a long term evolution-advanced (long term evolution-advanced, LTE-A) system, or may include a next generation NodeB (gNB) in a 5G NR system, or may include a centralized unit (CU) and a distributed unit (DU) in a cloud access network (Cloud RAN) system. This is not limited in the embodiments of this application.

3. Downlink transmission in an NR system is based on an orthogonal frequency division multiple access (OFDMA) technology, that is, a time-frequency resource is divided into an OFDM symbol (which is also referred to as a time domain symbol, symbol for short) in a time domain dimension and a subcarrier in a frequency domain dimension. A minimum resource granularity is referred to as a resource element (RE), that is, represents a time and frequency grid including a time domain symbol in time domain and a subcarrier in frequency domain. The NR system supports a plurality of time-frequency resource structures. FIG. 1 shows a time-frequency resource structure, where a subcarrier spacing of the time-frequency resource structure is 15 kHz, time domain symbol duration of the time-frequency resource structure is 70 μs, and cyclic prefix (cyclic prefix, CP) duration of the time-frequency resource structure is four to six μs. When the subcarrier spacing is 15 kHz, a time domain length of one slot (slot) is 1 ms, and the slot includes 14 symbols. If the subcarrier spacing changes, the corresponding length of the slot, a length of the symbol included in the slot, and the like correspondingly change. For example, if the subcarrier spacing is 30 kHz, the corresponding length of the slot is 0.5 ms, and the slot still includes 14 symbols. Compared with the length of the symbol when the subcarrier spacing is 15 kHz, when the subcarrier spacing is 30 kHz, a length of the symbol is shortened by half. For example, 28 symbols are included every 1 ms. In frequency domain, every 12 subcarriers form one RB. Herein, every 12 subcarriers do not refer to any 12 consecutive subcarriers, but are a $(12n+1)^{th}$ subcarrier to a $(12(n+1))^{th}$ subcarrier, where n is an integer. Each time and frequency grid in FIG. 1 is an RE, and one RB includes 12 subcarriers. FIG. 1 further includes a system bandwidth allocated by a system to a terminal device, that is, includes $N_{RB}^{DL}$ downlink RBs. A possible value of $N_{RB}^{DL}$ is 6, 12, or another possible value. Examples are not described again, 4. The terms "system" and "network" in the embodiments of this application may be used interchangeably. "At least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually represents an "or" relationship between the associated objects. "At least one of the following" or a similar expression indicates any combination of the items, and includes any combination of singular items or plural items. For example, at least one item (piece) of a, b, or c may indicate: a, b, c, a and b, a and c, b and c, or a, b, and c, where a, b, and c may be singular or plural.

In addition, unless otherwise stated, ordinal numbers such as "first" and "second" in the embodiments of this application are used to distinguish between a plurality of objects, but are not intended to limit a sequence, a time sequence, priorities, or importance degrees of the plurality of objects. For example, first synchronization information and second synchronization information are merely intended to distinguish between different synchronization information, but do not indicate that the two synchronization signals are different in content, a priority, a sending sequence, importance, or the like.

The foregoing describes some concepts in the embodiments of this application. The following describes technical features in the embodiments of this application.

After a terminal device is started, the terminal device needs to first access a network. Accessing the network is classified into uplink access and downlink access. The uplink access is a procedure in which the terminal device notifies an access network device that the terminal device exists, so that the access network device finally learns that the terminal device exists, and may receive uplink data sent by the terminal device. Correspondingly, the downlink access is a procedure in which the terminal device searches for the access network device, so that the terminal device can finally receive a downlink signal sent by the access network device, and can receive, after the downlink access, downlink data sent by the access network device.

Figure 2:
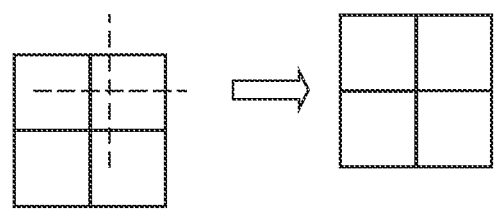
FIG. 2 is a schematic diagram of downlink synchronization.

The terminal device accesses the network, to correctly send data to or receive data from the access network device at a corresponding time-frequency resource position. FIG. 2 is a schematic diagram of downlink synchronization. Herein, that a time-frequency resource is aligned means that the terminal device aligns an RE boundary of the terminal device with a signal sent by the access network device, to correctly receive a signal in each RE. In FIG. 2, an area on the left of an arrow and shown by dashed lines is the signal sent by the access network device, and an area on the left of the arrow and shown by solid lines is the RE boundary of the terminal device.

Figure 3:
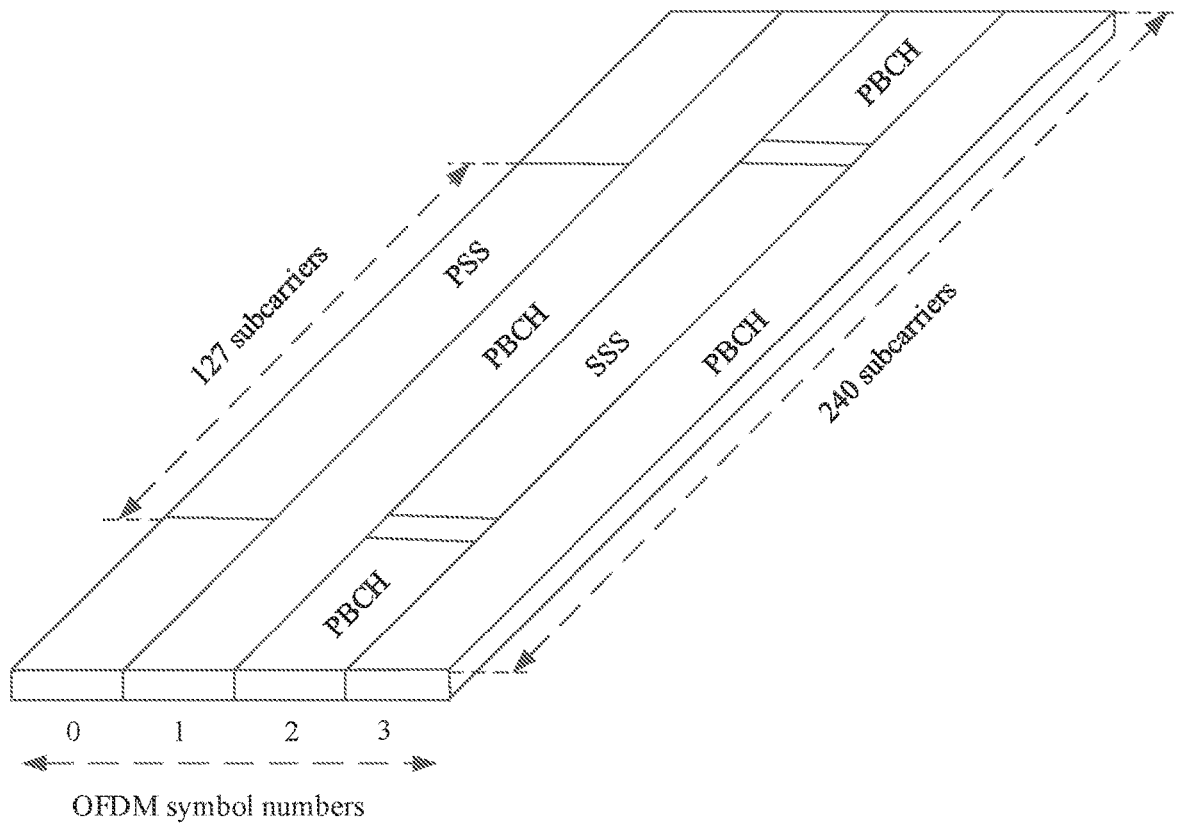
FIG. 3 is a schematic diagram of an existing SSB.

In an existing NR system, to enable each terminal device to perform downlink access to the network, the access network device may periodically send an SSB. Each terminal device may receive the SSB, to synchronize with the access network device, obtain a system message, and so on. FIG. 3 is a schematic structural diagram of an SSB. The SSB includes a PSS, an SSS, and PBCHs. As shown in FIG. 3, in time domain, one SSB occupies four OFDM symbols that are denoted as a symbol 0 to a symbol 3. In frequency domain, one SSB occupies 20 RBs, that is, 240 subcarriers.

In the 20 RBs, the subcarriers are numbered from 0 to 239. The PSS is located on middle 127 subcarriers in the symbol 0, and the SSS is located on middle 127 subcarriers in the symbol 2. To protect the PSS and the SSS, energy of different guard subcarriers is separately set to 0, that is, the 5 guard subcarriers are not used to carry signals, and eight subcarriers and nine subcarriers are respectively reserved on two sides of the SSS as guard band subcarriers. For example, in FIG. 3, blank areas on upper and lower sides of the SSS are the guard subcarriers. The PBCH occupies all subcarriers in the symbol 1 and the symbol 3, and a part of the remaining subcarriers (subcarriers other than the guard subcarriers in remaining subcarriers) other than the subcarriers occupied by the SSS in all subcarriers in the symbol 2.

Figure 4:
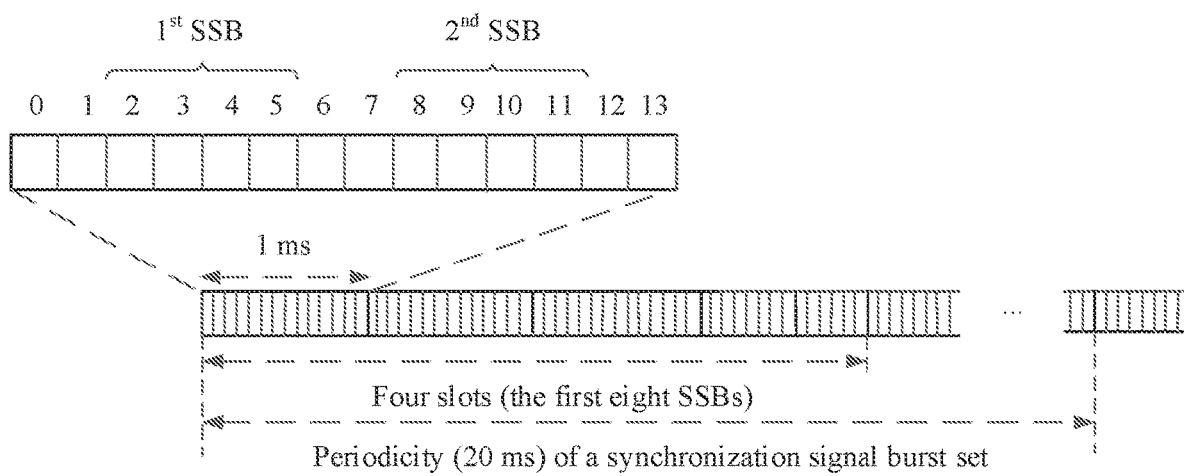
FIG. 4 is a schematic diagram of an SS burst set.

The access network device periodically sends the SSB, and a set including all SSBs in one sending periodicity is referred to as a synchronization burst set (synchronization signal burst set, SS burst set). The periodicity of the SS burst set may be configured as 5 ms (millisecond), 10 ms, 20 ms, 40 ms, 80 ms, 160 ms, or the like. As shown in FIG. 4, 20 ms is a default periodicity, namely, a periodicity assumed when the terminal device performs initial cell search. Currently, one SS burst set periodicity includes a maximum of $L_{max}$ SSBs, where $L_{max}$=4, 8, or 64. When a frequency of a carrier is less than or equal to 3 GHz, $L_{max}$=4, that is, one SS burst set periodicity includes a maximum of four SSBs, and a maximum of four beams are supported to be scanned. Each SS burst set is always within a time interval of 5 ms, and is the first half part or the second half part of a frame (frame) of 10 ms. In FIG. 4, an example in which one SS burst set periodicity includes eight SSBs is used. The eight SSBs are separately located in the $1^{st}$ slot to the $4^{th}$ slot (in the first 4 ms), each slot includes two SSBs, and no signal is sent in the next 16 ms, to reduce power consumption of an access network device. Due to an implementation reason of the access network device, a terminal device usually cannot receive all SSBs in one SS burst set, but can receive only a part of the SSBs in the SS burst set. However, the SSB received by the terminal device carries an index of the SSB, and there is a mapping relationship between the index of the SSB and a symbol position of the slot in the SS burst set periodicity. Therefore, the terminal device can learn of a time period in which the received SSB is located in the SS burst set periodicity. For example, in FIG. 4, if the SSB index of the SSB received by the terminal device is equal to 0, the terminal device may determine that the SSB received by the terminal device is located in the $3^{rd}$ symbol to the $6^{th}$ symbol in the $1^{st}$ slot in the SS burst set periodicity.

To reduce mutual interference between cells, when transmitting a downlink signal, the access network device usually uses a scrambling technology. Currently, the access network device may calculate a scrambling code by using an SFN, a cell ID, and the like, scramble to-be-transmitted information by using the scrambling code, and transmit the scrambled information. Therefore, to obtain the downlink signal through demodulation, the terminal device further needs to learn of information such as the SFN and the cell ID.

The cell ID is usually carried in the PSS and the SSS. For example, the PSS and the SSS separately carry a part of information in the cell ID. Because a time domain position of the PSS is always in the last symbol in the $1^{st}$ slot and the last symbol in the $11^{th}$ slot of each radio frame (continue to refer to FIG. 4), the terminal device may learn that a symbol in which the PSS is located is usually the $3^{rd}$ symbol or the $9^{th}$ symbol of a slot (in FIG. 4, counting starts from 0, and the $3^{rd}$ symbol or the $9^{th}$ symbol correspond to a symbol #2 and a symbol #8). The terminal device may obtain the PSS in the corresponding symbol, and demodulate the PSS, to obtain the cell ID. There are three possible sequences for the PSS, which correspond to three physical layer identifiers of each cell and are denoted as a formula (1).

$$N_{ID}^{(2)}=0,1,2 \quad (1)$$

In the formula (1), $N_{ID}^{(2)}$ is used to calculate the cell ID. The terminal device demodulates the PSS by using each possible sequence until the PSS is correctly demodulated. In this way, the terminal device learns of $N_{ID}^{(2)}$ the cell, and a boundary of each RE of the terminal device.

A frequency domain resource occupied by the SSS is the same as a frequency domain resource occupied by the PSS, and is located in two symbols after the symbol occupied by the PSS in time domain. Therefore, the terminal device may learn of a position of the SSS based on the position of the PSS, thereby directly detecting the SSS. There are 336 possible sequences for the SSS, which are separately denoted as a formula (2) correspondingly.

$$N_{ID}^{(1)}=0,1,\ldots,335 \quad (2)$$

In the formula (2), $N_{ID}^{(1)}$ is also used to calculate the cell ID. The terminal device demodulates each possible sequence of the SSS until the SSS is correctly demodulated.

The terminal device may calculate the complete cell ID by using $N_{ID}^{(1)}$ and $N_{ID}^{(2)}$. For a calculation manner, refer to a formula (3).

$$N_{ID}=3*N_{ID}^{(1)}+N_{ID}^{(2)} \quad (3)$$

The foregoing describes a manner of obtaining the cell ID, and the following describes how the terminal device obtains the SFN.

The SFN is carried on the PBCH. The terminal device may learn of a time-frequency domain position of the PBCH based on the position of the PSS, and further demodulate the PBCH, to obtain the SFN and the SSB index. For example, in FIG. 4, if the SSB index=0, it indicates that the terminal device detects that the position of the PSS is the $3^{rd}$ symbol of the $1^{st}$ slot of a system frame. If the SSB index=1, it indicates that the terminal device detects that the position of the PSS is the $9^{th}$ symbol of the $1^{st}$ slot of the system frame. The rest may be deduced by analogy. When the frequency of the carrier is less than 6 GHz, the SSB index is 7 at most, which corresponds to the $9^{th}$ symbol of the $4^{th}$ slot, of the system frame. The terminal device may detect the SSB shown in FIG. 3 or FIG. 4, and detect the PSS, the SSS, and the PBCHs in the SSB. After demodulating and receiving the SSB, the terminal device may complete downlink access based on the obtained information such as the cell ID and the SFN.

With the diversification of services supported by the NR system, for example, the NR system may be oriented to an eMBB service, a URLLC service, and a massive machine-type communication (mMTC) service, a design of the NR system can satisfy access requirements of terminal devices of different bandwidth types. For example, an eMBB terminal device may access the NR system by obtaining bandwidth information of the NR system. Considering aspects such as design costs and low power consumption, a part of mMTC terminal devices may access the NR system by obtaining the bandwidth information of the NR system. For another example, even for a same service type, different terminal devices have different service rate requirements. For example, the mMTC terminal device does not have a high requirement on a data transmission rate for services such as electricity meter reading, tracing, and on-demand payment, but usually requires deep coverage. Therefore, narrowband access is usually used. In addition, services such as surveillance video backhaul have a relatively high requirement on the data transmission rate. Therefore, an mMTC terminal device that supports the services may be considered as a terminal device that has a mid/high-end capability, and broadband access may be usually used.

In addition, with the diversification of the services in the NR system, capabilities of terminal devices in the NR system are also diversified, and the terminal devices can work in different system bandwidths.

Figure 5:
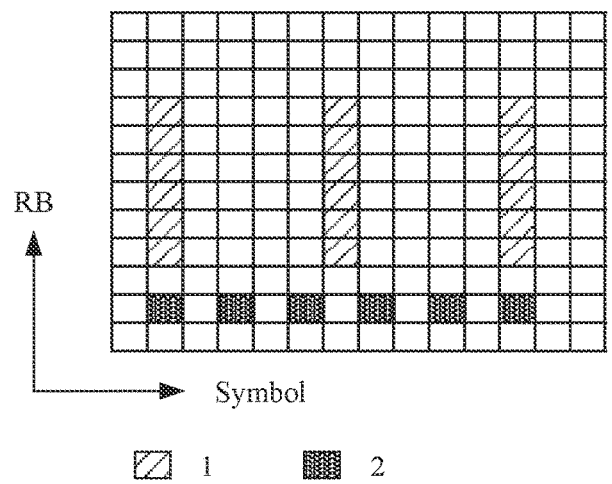
FIG. 5 is a schematic diagram of time-frequency resource positions of two sets of existing SSBs.

With the emergence of a narrowband terminal device such as an NB-IoT terminal device, because a bandwidth of an existing network system is 20 RBs shown in FIG. 3, the NB-IoT terminal device cannot receive an SSB that is for a broadband terminal device in the existing network system. Therefore, the NB-IoT terminal device cannot access a network by using the SSB of the existing network system. To ensure backward compatibility of LTE, currently, respective synchronization signals are separately designed for an LTE terminal device and the NB-IoT terminal device. As shown in FIG. 5, bandwidths of a PSS, an SSS, and a PBCH in LIE each are six RBs (there is no concept of the SSB in LIE), but a bandwidth in NB-IoT is one RB. To enable both the LTE terminal device and the NB-IoT terminal device to access a network, two sets of access signals are introduced into an LTE system. One set is broadband signals shown in shaded areas 1 in FIG. 5, where the broadband signals occupies six RBs and includes a PSS, an SSS, and a PBCH. The other set is narrowband signals shown in shaded areas 2 in FIG. 5, where the narrowband signals occupies one RB and includes a narrowband primary synchronization signal (NSSS), a narrowband secondary synchronization signal (NSSS), and a narrowband physical broadcast channel (NPBCH). However, terminal devices of a plurality of bandwidth types may exist in the future, for example, a 12-RB terminal device, a six-RB terminal device, and a one-RB terminal device. Because a part of information, such as a cell ID and an SFN, carried in SSBs corresponding to the terminal devices of different bandwidth types is usually the same, if an LTE design idea continues to be used, that is, in the NR system, corresponding SSBs are separately designed and sent for the terminal devices of various bandwidth types, the same information such as the cell ID and the SFN is repeatedly sent, and a relatively large amount of transmission resources need to be occupied.

In view of this, the technical solutions in the embodiments of this application are provided. The embodiments of this application provide a new SSB. The SSB may include a first PBCH carrying time-frequency resource position information of first synchronization information and a second PBCH carrying time-frequency resource position information of second synchronization information. The first synchronization information may be used for downlink synchronization of a broadband terminal device, and the second synchronization information may be used for downlink synchronization of a narrowband terminal device. Therefore, for terminal devices of different bandwidth types, an access network device may send a same SSB, and one SSB may satisfy synchronization requirements of the terminal device of various bandwidth types, thereby simplifying a system design. In addition, information such as a cell ID and an SFN also needs to be sent only once, and does not need to be repeatedly sent, thereby reducing transmission resources.

The technical solutions provided in the embodiments of this application may be applied to a wireless communication system, for example, a 4.5G system or a 5G system, a further evolved system based on LTE or NR, and a future wireless communication system or another similar communication system.

Figure 6:
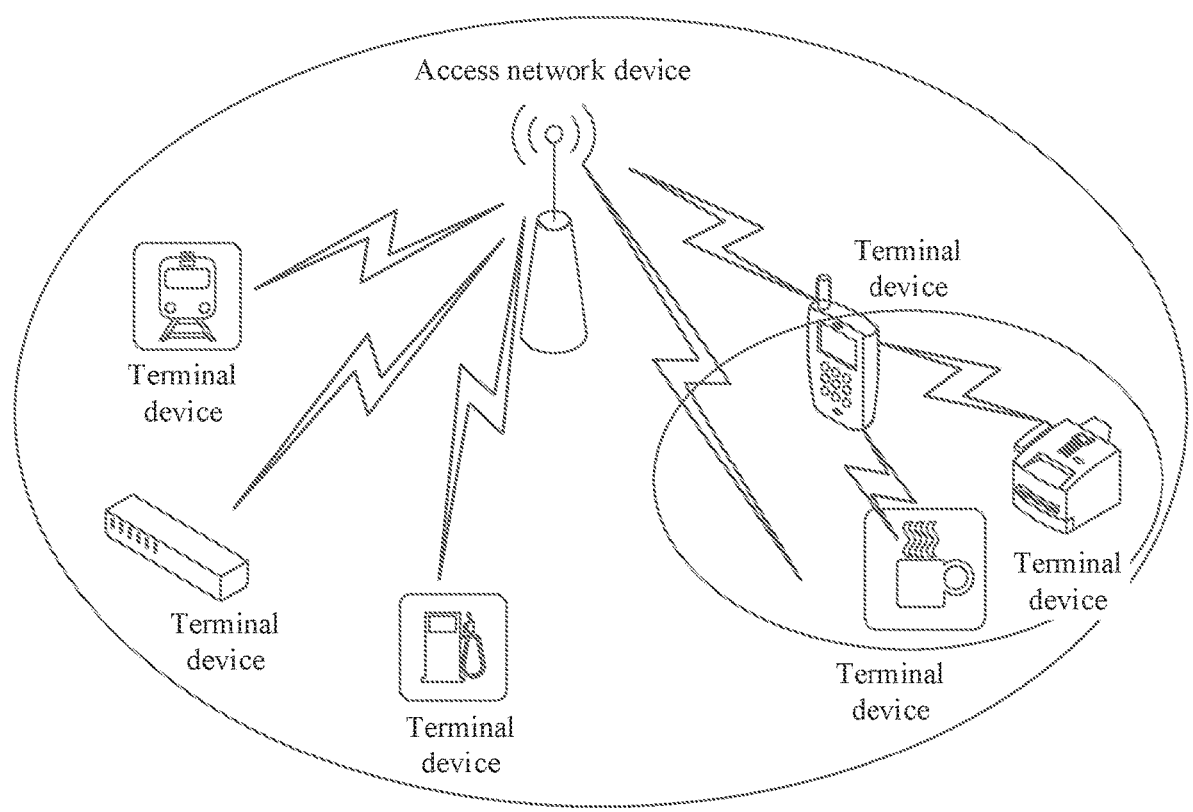
FIG. 6 is a schematic diagram of an application scenario according to an embodiment of this application.

FIG. 6 shows a network architecture to which the embodiments of this application are applied.

FIG. 6 includes an access network device and six terminal devices. The six terminal devices may be a cellular phone, a smartphone, a portable computer, a hand-held communication device, a hand-held computing device, a satellite radio apparatus, a global positioning system, a PDA, and/or any other suitable device used for communication in a wireless communication system, and can all be connected to the access network device. All the six terminal devices can communicate with the access network device. For example, the terminal device may be a narrowband terminal device such as an mMTC terminal device. The terminal device may be a broadband terminal device such as an NR terminal device of an existing release (release) 15. Certainly, a quantity of the terminal devices in FIG. 6 is merely an example, and may be smaller or larger.

The access network device in FIG. 6 may be a base station. The access network device corresponds to different devices in different systems. For example, the access network device may correspond to an eNB in a $4^{th}$ generation (4G) mobile communication technology system, and may correspond to a gNB in a 5G system.

The network architecture to which the embodiments of this application is applied may alternatively be a public land mobile network (Public Land Mobile Network, PLMN) network, a device-to-device (device-to-device, D2D) network, a machine-to-machine (machine to machine, M2M) network, an IoT network, or another network.

With reference to the accompanying drawings, the following describes the technical solutions provided in the embodiments of this application.

An embodiment of this application provides a communication method. In the following description procedure, an example in which the method is applied to the network architecture shown in FIG. 6 is used. In addition, the method may be performed by two communication apparatuses. The two communication apparatuses are, for example, a first communication apparatus and a second communication apparatus. The first communication apparatus may be an access network device or a communication apparatus that can support an access network device in implementing a required function of the method, or may be a terminal device or a communication apparatus that can support a terminal device in implementing a required function of the method. Certainly, the first communication apparatus may alternatively be another communication apparatus, for example, a chip system. The second communication apparatus may be an access network device or a communication apparatus that can support an access network device in implementing a required function of the method, or may be a terminal device or a communication apparatus that can support a terminal device in implementing a required function of the method. Certainly, the second communication apparatus may alternatively be another communication apparatus, for example, a chip system. In addition, implementations of the first communication apparatus and the second communication apparatus are not limited. For example, the first communication apparatus may be an access network device, and the second communication apparatus is a terminal device; the first communication apparatus is an access network device, and the second communication apparatus is a communication apparatus that can support a terminal device in implementing a required function of the method; or the first communication apparatus is a communication apparatus that can support an access network device in implementing a required function of the method, and the second communication apparatus is a communication apparatus that can support a terminal device in implementing a required function of the method.

For ease of description, the following uses an example in which the method is performed by an access network device and a terminal device, that is, an example in which the first communication apparatus is an access network device and the second communication apparatus is a terminal device. For example, an access nets pork device in the following may be the access network device in FIG. 6, and a terminal device in the following may be any one of the terminal device 101 to the terminal device 106 in FIG. 6. It should be noted that this embodiment of this application only uses an example in which the access network device and the terminal device are used for execution, but is not limited to this scenario.

Figure 7:
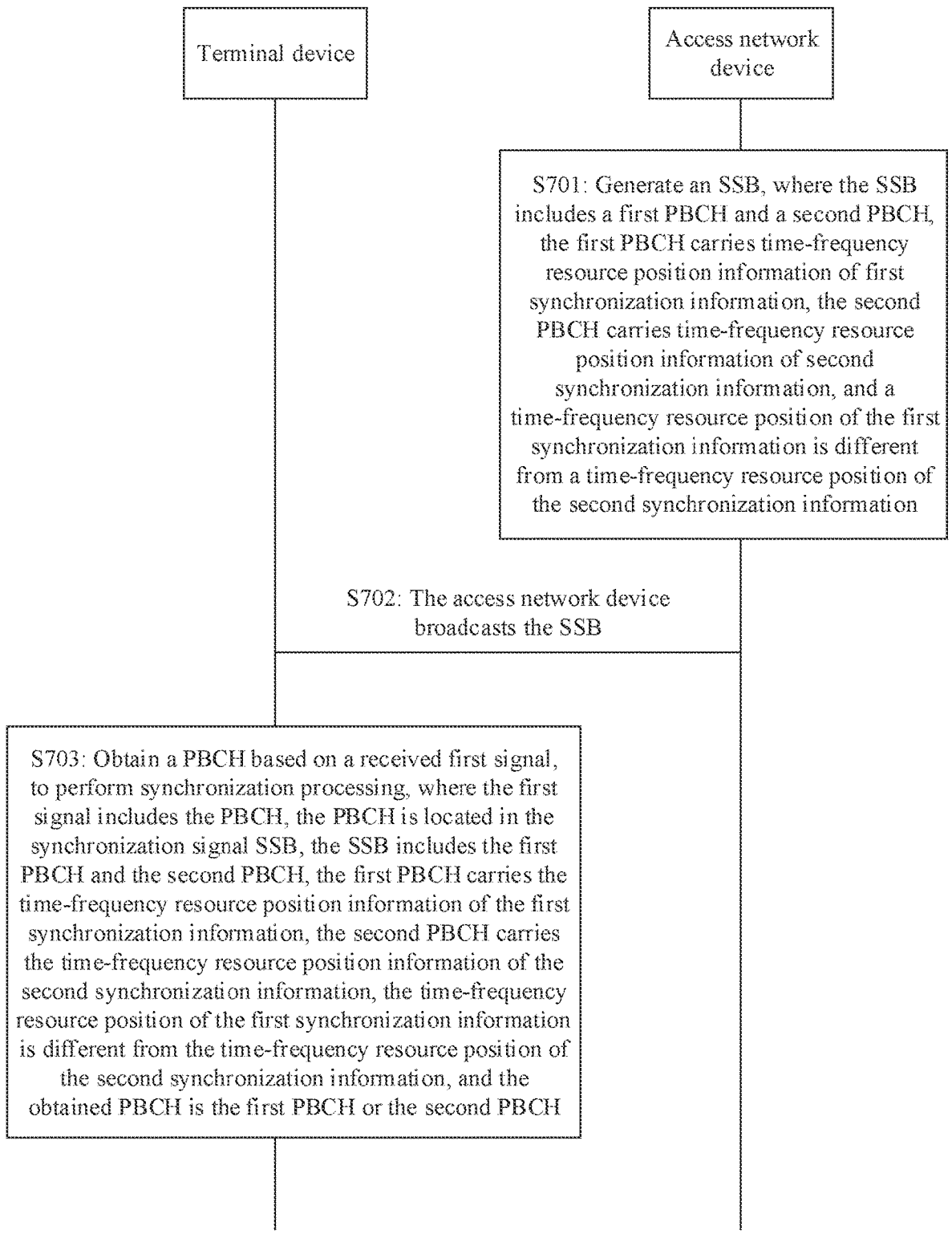
FIG. 7 is a flowchart of a communication method according to an embodiment of this application.

Specifically, FIG. 7 is a flowchart of the method.

S701: The access network device generates an SSB, where the SSB includes a first PBCH and a second PBCH, the first PBCH carries time-frequency resource position information of first synchronization information, the second PBCH carries time-frequency resource position information of second synchronization information, and a time-frequency resource position of the first synchronization information is different from a time-frequency resource position of the second synchronization information.

Herein, it should be noted that the first PBCH and the second PBCH may be one PBCH as a whole, or may be a plurality of PBCHs. Logically, this embodiment of this application is described by using the first PBCH and the second PBCH.

In this embodiment of this application, the SSB may include a PSS, an SSS, and a PBCH. The PBCH may include a plurality of parts. For example, continuing to refer to FIG. 3, the PBCH includes four parts: a first part, a second part, a third part, and a fourth part. The first part occupies the symbol 1 in time domain, and occupies, in frequency domain, all subcarriers occupied by the SSB. The second part, occupies the symbol 3 in time domain, and occupies, in frequency domain, all the subcarriers occupied by the SSB. The third part occupies the symbol 2 in time domain, and occupies, in frequency domain, a part of subcarriers in remaining subcarriers other than the subcarriers occupied by the SSB. The fourth part occupies the symbol 2 in time domain, and occupies, in frequency domain, another part of subcarriers in remaining RBs other than the subcarriers occupied by the SSB.

The SSB may include the first PBCH and the second PBCH. The first PBCH may be all the four parts shown in FIG. 4, and the second PBCH may be a proper subset of the four parts shown in FIG. 4. For example, the second PBCH may be the third part and the fourth part. Compositions of the first PBCH and the second PBCH are not limited in this embodiment of this application.

The first PBCH may carry the time-frequency resource position information of the first synchronization information, and the second PBCH may carry the time-frequency resource position information of the second synchronization information. Both the first synchronization information and the second synchronization information may be used to perform synchronization between the terminal device and the access network device. For example, the first synchronization information may be used by a broadband terminal device to perform synchronization processing, and the second synchronization information may be used by a narrowband terminal device to perform synchronization processing. The broadband terminal device and the narrowband terminal device herein are relative. For example, if the broadband terminal device is a 12-RB terminal device, the narrowband terminal device may be a six-RB terminal device. In this case, the first synchronization information is used to perform synchronization between the 12-RB terminal device and the access network device, and the second synchronization information is used to perform synchronization between the six-RB terminal device and the access network device. The synchronization processing herein may be a synchronization procedure, or may be a part of a synchronization procedure, for example, a PBCH detection procedure or a time synchronization procedure between the terminal device and the access network device. Certainly, the synchronization processing herein may alternatively be another possible procedure.

The time-frequency resource position information of the first synchronization information is different from the time-frequency resource position information of the second synchronization information, so that the broadband terminal device and the narrowband terminal device may simultaneously obtain the first synchronization information and the second synchronization information from the different time-frequency resource positions. In this way, the SSB may include both the PBCH used by the broadband terminal device and the PBCH used by the narrowband terminal device. Therefore, in this embodiment of this application, only one type of SSB needs to be sent to simultaneously satisfy synchronization processing requirements of both the broadband terminal device and the narrowband terminal device. In addition, for terminal devices of different bandwidth types, information, such as a cell ID and an SFN, included in the SSB is the same. Therefore, in this embodiment of this application, the access network device needs to send only one type of SSB, where the information such as the cell ID and the SFN is included in the SSB, so that SSBs do not need to be separately sent to the terminal devices of different bandwidth types, and requirements of the terminal devices of various bandwidth types can also be satisfied. In addition, transmission resources are reduced, an SSB design is simplified, redundancy of information received by the terminal device is reduced, and validity of transmitted information is improved.

In a possible implementation, the first synchronization information is an SIB1, for example, referred to a first SIB1, and the second synchronization information is also an SIB1, for example, referred to a second SIB1.

The time-frequency resource position information of the first synchronization information may indicate the time-frequency resource position of the first SIB1. The time-frequency resource position information of the second synchronization information may indicate the time-frequency resource position of the second SIB1. In this embodiment of this application, the time-frequency resource position includes a time domain resource position and/or a frequency domain resource position. Specifically, the time-frequency resource position includes the time domain resource position or the frequency domain resource position, or includes the time domain resource position and the frequency domain resource position. For example, the time-frequency resource position information of the second synchronization information may be position information of the second SIB1. Alternatively, the time-frequency resource position information of the second synchronization information may be a carrier resource block (CRB) offset. Alternatively, the time-frequency resource position information of the second synchronization information may include position information of the second SIB1 and a CRB offset. The CRB offset may be an offset between a frequency domain resource used by the access network device to send a next piece of data after the access network device sends the SSB and a frequency domain resource used by the narrowband terminal device to receive the SSB, to indicate a position at which the terminal device receives the second SIB1. A frequency domain resource of the second SIB1 may be configured for the narrowband terminal device by using the second PBCH, so that the narrowband terminal device can receive the second SIB1, to perform downlink synchronization based on the second SIB1.

Figure 8:
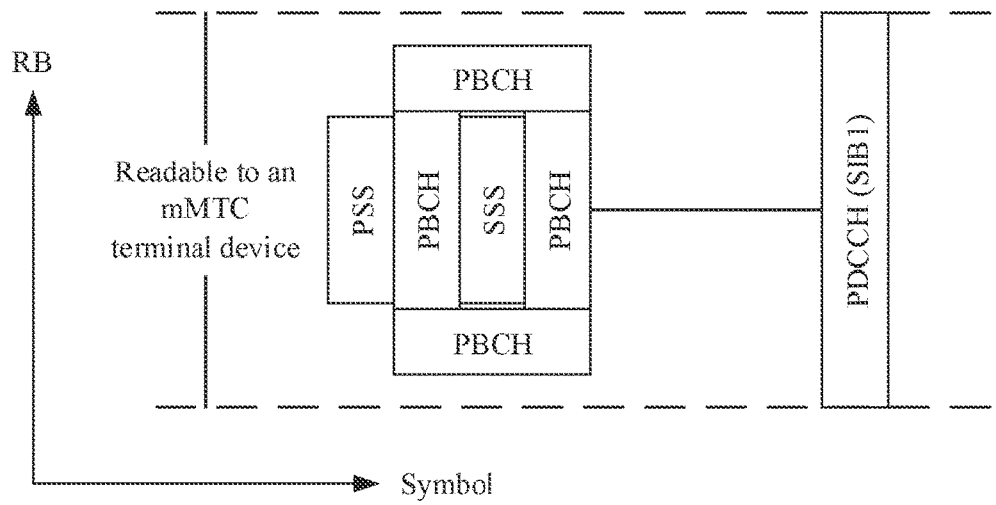
FIG. 8 is a schematic structural diagram of an SSB according to an embodiment of this application.

For example, FIG. 8 is a schematic diagram of an SSB. The SSB is applied to a communication system that includes a broadband terminal device (for example, a legacy terminal device) and a narrowband terminal device (for example, an mMTC terminal device). It is assumed that an SIB1 shown in FIG. 8 is carried on a physical downlink control channel (PDCCH) whose bandwidth is 24 RBs, and a bandwidth of the mmx terminal device is 25 RBs. Therefore, the mMTC terminal device may receive information within 25 RBs. Therefore, the mMTC terminal device may receive an SSB corresponding to the legacy terminal device, and further detect time-frequency resource position information of a second SIB1 carried on a second PBCH in the SSB, to receive the second SIB1 from an access network device based on a time-frequency resource position indicated by the time-frequency resource position information. The legacy terminal device may receive the SSB corresponding to the legacy terminal device, so that the legacy terminal device may also obtain a first SIB1 from the received SSB. In this case, a time-frequency resource position of the first SIB1 and the time-frequency resource position of the second SIB1 are the same. In addition, in this case, the first PBCH and the second PBCH may be a same PBCH, or may be different PBCHs.

Figure 9:
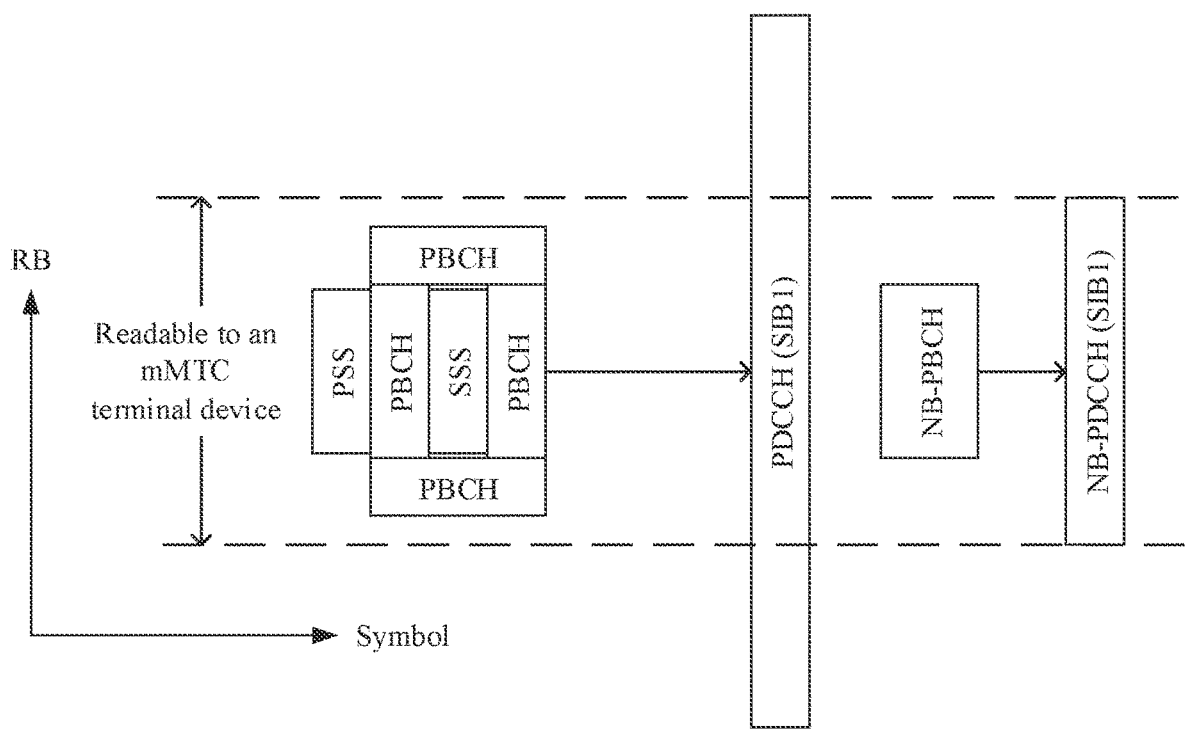
FIG. 9 is a schematic structural diagram of an SSB according to an embodiment of this application.

For another example, FIG. 9 is a schematic diagram of another SSB. The SSB is also applied to a system that includes a legacy terminal device and an mMTC terminal device. It is assumed that an SIB1 shown in FIG. 9 is carded in a PDCCH control resource set CORESET whose bandwidth is 48 RBs. Information such as a frequency band occupied by a PDCCH in frequency domain and a quantity of OFDM symbols occupied by the PDCCH in time domain is encapsulated in the CORESET. An access network device sends the PDCCH in the PDCCH CORESET. Generally, the PDCCH evenly occupies a part of resources in the PDCCH CORESET, and the part of resources can be exactly divided by 4. For example, the bandwidth occupied by the PDCCH CORESET is 48 RBs, and the PDCCH evenly occupies a part of resources in the PDCCH CORESET, for example, 24 RBs. Because a bandwidth of the mMTC terminal device is 25 RBs, the mMTC terminal device cannot receive information whose bandwidth is 48 RBs. Therefore, the mMTC terminal device cannot detect an SSB corresponding to the legacy terminal device.

For example, the PDCCH (carrying the SIB1) in FIG. 9 exceeds a frequency domain boundary, namely, a boundary between a bandwidth of a narrowband terminal device and a bandwidth of a broadband terminal device (the frequency domain boundary is shown by using horizontal dashed lines in FIG. 8 and FIG. 9). Therefore, the mMTC, terminal device cannot receive a part, exceeding the frequency domain boundary, of the SIB1. The access network device needs to separately configure, for the mMTC terminal device, the time-frequency resource position information of the second SIB1 by using the second PBCH, to indicate a time-frequency resource position of the second SIB1, so that the mMTC terminal device may receive the second SIB1 based on an indication of the second PBCH. For example, the mMTC terminal device receives the second SIB1 on an NB-PDCCH (carrying the SIB1) in FIG. 9. In FIG. 9, the second PBCH is represented as the narrowband physical broadcast channel (NB-PBCH). For example, the bandwidth of the PDCCH CORESET used to carry the SIB1 is 24 RBs or 48 RBs. A specific value may be indicated by time-frequency resource position information of the SIB1. If the access network device configures the PDCCH CORESET of 48 RBs, the mMTC terminal device cannot receive the SIB1, and the access network device needs to indicate, to the mMTC terminal device by using the second PBCH, another PDCCH CORESET whose bandwidth is 24 RBs, so that the mMTC terminal device can receive the second SIB1.

In this embodiment of this application, the first SIB1 and the second SIB1 may include same or different information.

If the access network device does not need to distinguish between types of terminal devices, the first SIB1 and the second SIB1 may include same information. The SIB1 including the same information is configured for both the broadband terminal device and the narrowband terminal device, thereby reducing load of the access network device. If the first SIB1 and the second SIB1 include different information, when obtaining the first SIB1 and the second SIB1, the narrowband terminal device needs to parse only the second SIB1 belonging to the narrowband terminal device, and does not need to parse the first SIB1, so that workload of the terminal device can be reduced.

In an optional implementation, the first PBCH may further carry third synchronization information. The time-frequency resource position information of the first synchronization information and the third synchronization information are used by the broadband terminal device to perform downlink synchronization, and the time-frequency resource position information of the second synchronization information and the third synchronization information are used by the narrowband terminal device to perform downlink synchronization.

For example, the third synchronization information may include synchronization information that may be shared by the broadband terminal device and the narrowband terminal device, for example, the SFN. The third synchronization information is included in the first PBCH. Both the broadband terminal device and the narrowband terminal device may receive the SSB, and obtain the first PBCH included in the SSB, to obtain the third synchronization information. In this way, PBCHs carrying the third synchronization information do not need to be separately designed for the broadband terminal device and the narrowband terminal device. Compared with that the PBCHs carrying the third synchronization information are separately designed for the broadband terminal device and the narrowband terminal device, and resources occupied by the PBCHs are a quantity of bits occupied by two pieces of third synchronization information, the first PBCH carries only one piece of third synchronization information, so that a quantity of occupied bits is smaller, so that resources are reduced.

A bandwidth of a PBCH included in an SSB corresponding to the broadband terminal device is wider, for example, is 20 RBs, and a bandwidth of a PBCH included in an SSB corresponding to the narrowband terminal device is narrower, for example, is 12 RBs. Therefore, the narrowband terminal device cannot receive the PBCH of the broadband terminal device. To enable the narrowband terminal device to receive the PBCH of the broadband terminal device, the access network device may send, in a narrower bandwidth, the PBCH used for the broadband terminal device, so that the narrowband terminal device can receive the PBCH of the broadband terminal device.

In this embodiment of this application, the SSB may further include a third PBCH. A frequency domain resource of the first PBCH is referred to as a first frequency domain resource, a frequency domain resource of the third PBCH is referred to as a third frequency domain resource, and the first frequency domain resource includes a second frequency domain resource and the third frequency domain resource. Information carried on the third PBCH is the same as information carried on the first PBCH on the second frequency domain resource, or a signal carried on the third PBCH is the same as a signal carried on the first PBCH on the second frequency domain resource. The signal herein refers to information on which baseband processing and radio frequency processing are performed and that is carried on the second frequency domain resource. The baseband processing includes modulation, encoding, and the like, and the radio frequency processing includes up-conversion and the like. In this way, the PBCH used for the broadband terminal device may be sent in a narrower bandwidth, that is, information carried on the PBCH of the broadband terminal device is carried on the first PBCH and the third PBCH for sending, and a total occupied frequency domain resource is the first frequency domain resource, so that the bandwidth occupied by the PBCH of the broadband terminal device and the bandwidth occupied by the PBCH of the narrowband terminal device may be the same. Therefore, the narrowband terminal device can receive the PBCH of the broadband terminal.

Figure 10:
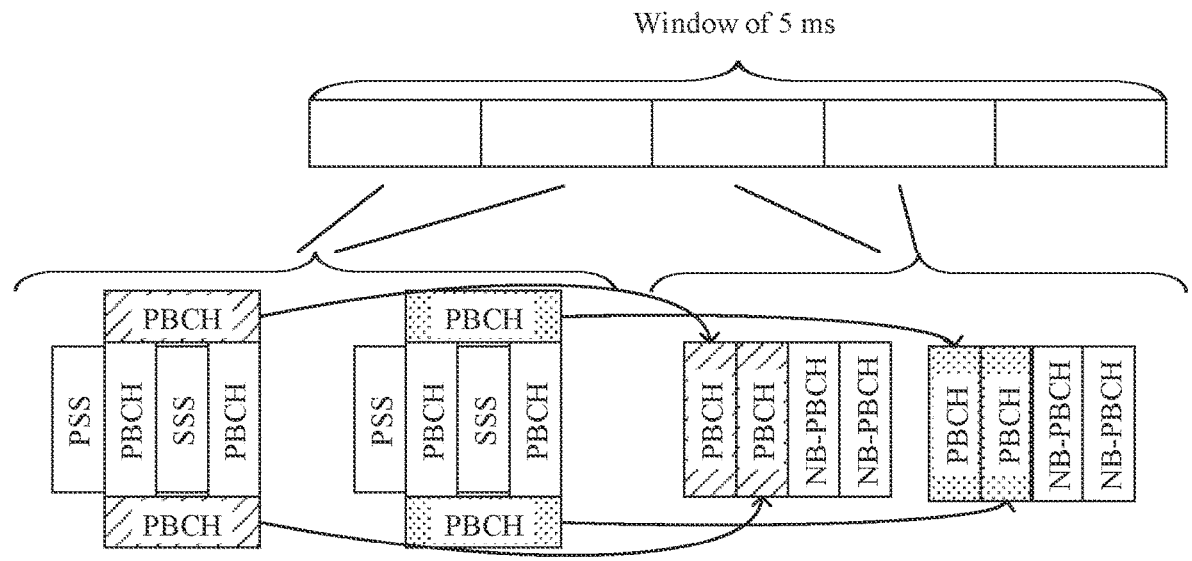
FIG. 10 is a schematic structural diagram of an SSB according to an embodiment of this application.

For example, FIG. 10 is a schematic diagram of an SSB. Before FIG. 10 is specifically described, a frame structure (frame structure) in an existing NR system is first described, to help understand the solutions in the embodiments of this application. However, this does not mean that the embodiments of this application are applicable to only the NR system. In the NR system, each frame includes 10 subframes (subframes) with a length of 1 ms, and is divided into two half-frames (half-frames) whose sizes are equal, which are separately a half frame 0 and a half frame 1. The half frame 0 includes subframes 0 to 4, and the half frame 1 includes subframes 5 to 9. In FIG. 10, an example in which the SSB is located in a half frame, that is, a time window of 5 ms is used. The SSB is used for synchronization processing of a broadband terminal device (for example, a legacy terminal device) and synchronization processing of a narrowband terminal device (for example, a 12-RB terminal device). A bandwidth of a PBCH included in an SSB corresponding to the broadband terminal device is 20 RBs, and a bandwidth of a PBCH included in an SSB corresponding to the narrowband terminal device is 12 RBs. Therefore, the narrowband terminal device cannot receive the PBCH of the broadband terminal device.

For example, continuing to refer to FIG. 10, both a bandwidth of a PSS and a bandwidth of an SSS of the SSB corresponding to the legacy terminal device are 12 RBs, so that the PSS and the SSS of the SSB corresponding to the legacy terminal device can be received by the 12-RB terminal device. However, the bandwidth of the PBCH of the SSB corresponding to the legacy terminal device is 20 RBs. Therefore, eight non-central RBs (including a PSS/an SSS/a PBCH) of the 20 RBs, namely, eight RBs other than the 12 RBs, need to be re-sent within time duration after the central 12 RBs (including a PSS/an SSS/a PBCH) are sent. In this way, the 12-RB terminal device can receive all information in the SSB of the legacy terminal device. The eight non-central RBs may be PBCHs that are located on the upper and lower sides of the SSSs and that are indicated by using arrows in FIG. 10, that is, PBCHs shown in shaded areas in FIG. 10. However, for a PBCH of the 12-RB terminal device, namely, the second PBCH, for example, NB-PBCHs in FIG. 10, the access network device may continue to send the second PBCH within time duration after sending the third PBCH. In this way, the SSB shown in FIG. 10 may be received by the legacy terminal device, and may also be received by the 12-RB terminal device. After receiving the SSB, the 12-RB terminal device may demodulate the PBCH of the legacy terminal device, for example, demodulate a PBCH (the first PBCH) in the 12 central RBs in FIG. 10 and the NB-PBCH that is additionally sent by the access network device and that is applicable to the 12-RB terminal device. The legacy terminal device may receive only a PBCH applicable to the legacy terminal device, that is, receive only the first PBCH and the third PBCH, and does not receive the NB-PBCH. In other words, it is not stipulated in a standard that the legacy terminal device needs to read a PBCH other than the first PBCH and the third PBCH. In this case, the legacy terminal device does not learn that the access network device transmits a PBCH of a terminal device of another bandwidth type on another time-frequency resource, but may consider that other information, such as data information, of another terminal device is transmitted on the resource. The SSB shown in FIG. 10 can satisfy both a requirement of the legacy terminal device and a requirement of the 12-RB terminal device. FIG. 10 shows the SSB in a case in which two 12-RB terminal devices coexist with the legacy terminal device. FIG. 10 shows the two 12-RB terminal devices by using different shadow patterns.

In a possible implementation, the frequency domain resource of the third PBCH is a proper subset of the frequency domain resource of the first PBCH, that is, the frequency domain resource of the third PBCH is a subset of the frequency domain resource of the first PBCH, and the frequency domain resource of the first PBCH is not a subset of the frequency domain resource of the third PBCH. In this way, the frequency domain resource of the first PBCH and the frequency domain resource of the third PBCH are partially multiplexed, so that transmission resources used by the access network device to send the SSB are reduced.

The information carried on the third PBCH may be information on a frequency domain resource that is other than a frequency domain resource of the second PBCH and that is in the frequency domain resource of the first PBCH. As described above, the information carried on the PBCH of the broadband terminal device is carried on the first PBCH and the third PBCH for sending. To help the broadband terminal device and the narrowband terminal device separately parse the PBCHs that belong to the broadband terminal device and the narrowband terminal device, the frequency domain resource occupied by the third PBCH is different from the frequency domain resource occupied by the second PBCH, so that the broadband terminal device may not need to parse the second PBCH.

Because a maximum bandwidth supported by the broadband terminal device is greater than a maximum bandwidth supported by the narrowband terminal device, the broadband terminal device may receive the SSB of the narrowband terminal device, so that the broadband terminal device may perform synchronization by using the SSB of the narrowband terminal device. In this way, the access network device may design only one set of SSB, to simplify an SSB design. However, if the broadband terminal device performs synchronization based on the SSB of the narrowband terminal device, synchronization performance may be poor. Therefore, the SSB provided in this embodiment of this application may further include a fourth PBCH, to change, for a third-type terminal device, all or a part of information included in the first PBCH, for example, position information of an SIB1. In this way, the third-type terminal device may determine synchronization information of the third-type terminal device based on the first PBCH and the fourth PBCH, to improve synchronization performance of the third-type terminal device as much as possible. That a maximum bandwidth supported by the third-type terminal device is greater than or equal to a maximum bandwidth supported by a first-type terminal device may be understood as that the third-type terminal device is a broadband terminal device relative to the first-type terminal device.

Figure 11:
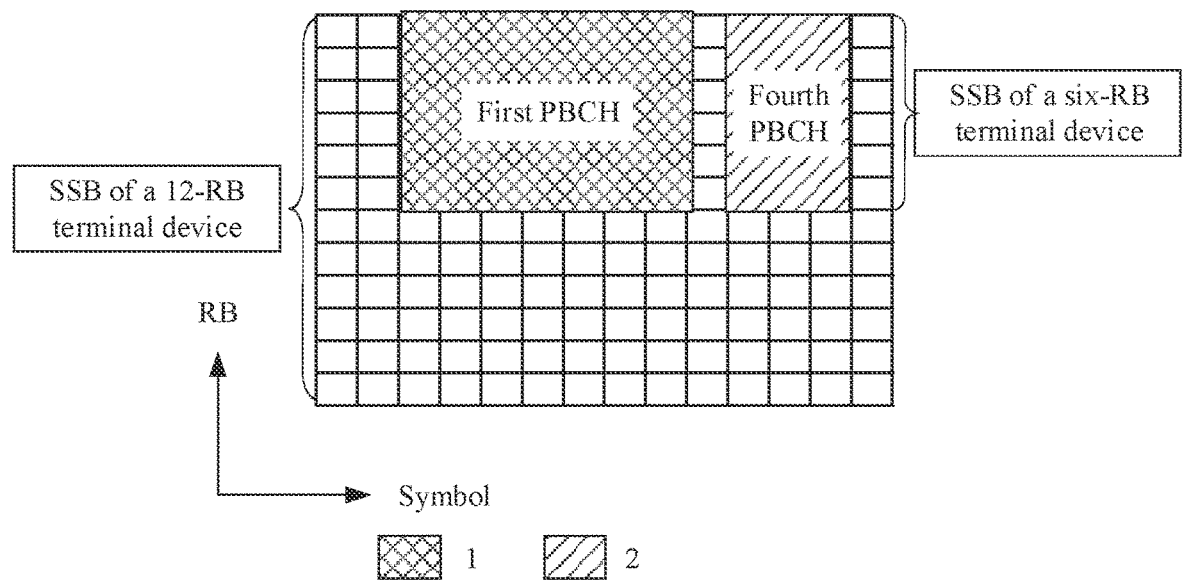
FIG. 11 is a schematic structural diagram of a PBCH in an SSB according to an embodiment of this application.

For example, FIG. 11 is a schematic diagram of a PBCH included in an SSB. FIG. 11 uses an example in which there are terminal devices of two bandwidth types. Bandwidths of the terminal devices of two bandwidth types are separately BWi and BWj, where BWi<BWj. For example, if a terminal device whose bandwidth is BWi is a second-type terminal device, a terminal device whose bandwidth is BWj is a first-type terminal device or a third-type terminal device. If a terminal device whose bandwidth is BWi is a first-type terminal device, a terminal device whose bandwidth is BWj is a third-type terminal device. It may be understood that the terminal device whose bandwidth is BWi is a narrowband terminal device, and the terminal device whose bandwidth is BWj is a broadband terminal device.

In FIG. 11, an example in which the terminal device whose bandwidth is BWi is a six-RB terminal device, and the terminal device whose bandwidth is BWj is a 12-RB terminal device is used. In FIG. 11, a PBCH in a shaded area 1 is a PBCH of the six-RB terminal device, namely, a first PBCH, a PBCH in a shaded area 2 is a fourth PBCH, and both the first PBCH and the fourth PBCH may be received by the 12-RB terminal device. The fourth PBCH may be used to change a part of information in the first PBCH, for example, may be used to change time-frequency resource position information of an SIB1 carried on the first PBCH. In this way, after receiving an SSB from an access network device, the six-RB terminal device needs to only obtain synchronization information such as a required SIB from the first PBCH included in the SSB, and then performs synchronization processing. After receiving the SSB, in addition to obtaining the first PBCH included in the SSB, the 12-RB terminal device further needs to obtain the fourth PBCH, to obtain the synchronization information such as the required SIB based on the obtained first PBCH and the fourth PBCH, and further perform synchronization processing.

Because the fourth PBCH carries only the part of information used by the 12-RB terminal device to perform synchronization, a quantity of bits occupied by the fourth PBCH is less than a quantity of bits (which is usually 56 bits) occupied by a PBCH carrying all the information used by the 12-RB terminal device to perform synchronization. Therefore, in this embodiment of this application, when the access network device sends the PBCH of the six-RB terminal device and additionally sends the fourth PBCH used for the 12-RB terminal device, occupied resources are fewer than resources occupied when the access network device sends, to the 12-RB terminal device again, the PBCH carrying all the information used by the 12-RB terminal device to perform synchronization.

In a possible implementation, the fourth PBCH carries time-frequency resource position information of an SIB1 used for the third-type terminal device and/or a CRB offset, to indicate a position at which the third-type terminal device receives a PDCCH after the third-type terminal device completes downlink access. The fourth PBCH reconfigures position information of the SIB1 for the third-type terminal device, so that the third-type terminal device receives the PDCCH in a bandwidth greater than the maximum bandwidth supported by the first-type terminal device, thereby helping improve performance of receiving the PDCCH by the third-type terminal device. In addition, the CRB offset may indicate an offset between a frequency domain resource used by the access network device to send a next piece of data after the access network device sends the SSB and a frequency domain resource used by a terminal device to receive the SSB, to indicate a position at which the third-type terminal device receives the second SIB1, where the terminal device herein may be the third-type terminal device. That is, the fourth PBCH reconfigures the CRB offset for the terminal device, so that data transmission of terminal devices of different bandwidth types may be spread on different frequency bands, to reduce network congestion.

In a possible implementation, the fourth PBCH and the first PBCH may be nonconsecutive in time domain, and a corresponding time interval may be reserved between the fourth PBCH and the first PBCH as a guard interval.

A frequency domain resource of the fourth PBCH may have the following cases. The following separately describes the frequency domain resource of the fourth PBCH.

First case: The frequency domain resource of the fourth PBCH is located in the frequency domain resource of the first PBCH.

It can be learned from FIG. 11 that the frequency domain resource of the PBCH of the six-RB terminal device is located in the frequency domain resource of the PBCH of the 12-RB terminal device, that is, the frequency domain resource occupied by the PBCH of the narrowband terminal device is located in the frequency domain resource occupied by the PBCH of the broadband terminal device. A maximum frequency domain resource that may be occupied by the PBCH of the narrowband terminal device is the frequency domain resource occupied by the PBCH of the broadband terminal device, so that a frequency domain resource occupied to separately design a PBCH for the broadband terminal device is reduced.

Second case: The frequency domain resource of the fourth PBCH is located outside the frequency domain resource of the first PBCH.

Figure 12:
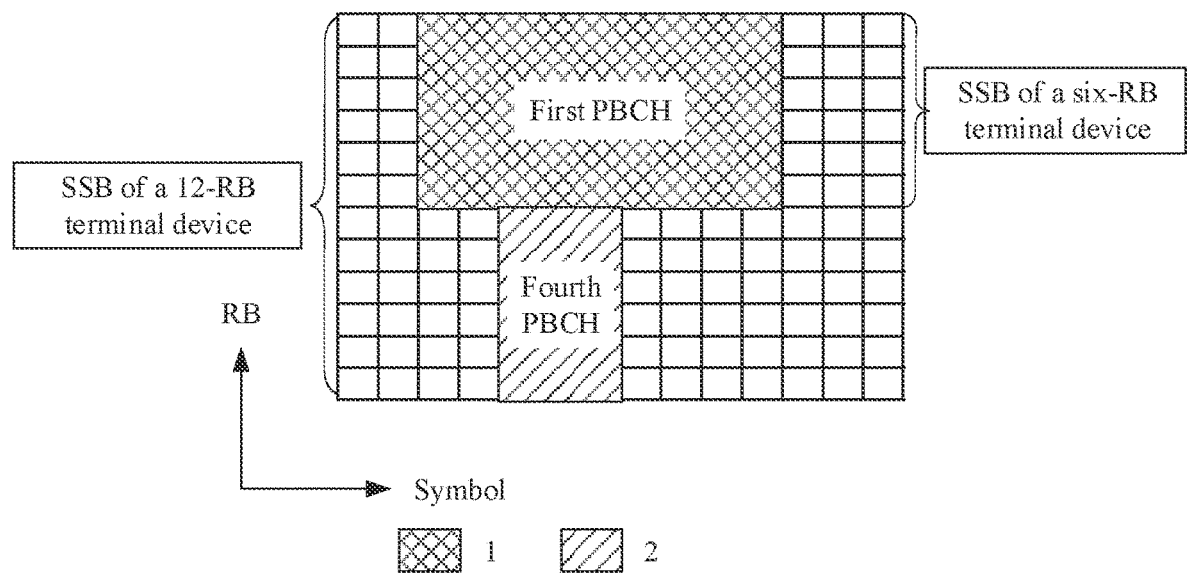
FIG. 12 is a schematic structural diagram of a PBCH in an SSB according to an embodiment of this application.

For example, FIG. 12 is a schematic diagram of a PBCH included in an SSB. In FIG. 12, an example in which there is a six-RB terminal device and a 12-RB terminal device is used. A PBCH in a shaded area 1 in FIG. 12 is a PBCH of the six-RB terminal device, namely, a first PBCH. A PBCH in a shaded area 2 is a part of a PBCH of the 12-RB terminal device, namely, a fourth PBCH. It can be learned from FIG. 12 that a frequency domain resource occupied by the fourth PBCH is located in a frequency domain resource occupied by the PBCH of the 12-RB terminal device, and is located outside a frequency domain resource occupied by the PBCH of the six-RB terminal device.

The fourth PBCH is information dedicated to the broadband terminal device, and therefore the fourth PBCH is located in the frequency domain resource occupied by PBCH of the 12-RB terminal device, and is located outside the frequency domain resource occupied by the PBCH of the six-RB terminal device. Therefore, information carried in a signal detected by the narrowband terminal device on a frequency band is information for the narrowband terminal device, and is irrelevant to the broadband terminal device, so that it is not necessary to further determine, in the obtained information, information that does not belong to the narrowband terminal device. In addition, the PBCH uses this frequency domain structure, that is, the frequency band on which the narrowband terminal device is located is only for the PBCH of the narrowband terminal device, and there is no PBCH of the broadband terminal device, so that the signal on the frequency band in which the narrowband terminal device is located is looser in time domain. In this way, a quantity of times for which the access network device sends the SSB may be greater, thereby improving system coverage. In addition, the PBCH uses this frequency domain structure, and the first PBCH and the fourth PBCH occupy a same symbol for sending, so that the broadband terminal device and the narrowband terminal device can quickly receive all PBCH signals, thereby improving a system access speed.

S702: The access network device broadcasts the SSB.

In this embodiment of this application, the access network device may broadcast the SSB on same frequency domain resources within at least one time window. In this embodiment of this application, the SSB is in duration. The duration may be considered as a time window. For example, the current SSB is located in a time window of 5 ms, and the time window of 5 ms may be a periodicity of an SS burst set. Certainly, a length of the time window in which the SSB is located is not limited in this embodiment of this application, and may alternatively be another length other than 5 ms. However, the SSB in this embodiment of this application is also in the time window of 5 ms, to help the SSB be compatible with an existing system.

The access network device may broadcast the SSB within the at least one time window, so that the SSB may be located in at least one nonconsecutive time window. The access network device may broadcast one SSB or a plurality of SSBs within one time window. In this embodiment of this application, slots in which the PSS, the SSS, and the PBCH included in the SSB are located in the time window and symbols in which the PSS, the SSS, and the PBCH included in the SSB are located in the corresponding slots may be configured by the access network device, or may be specified in a protocol.

In this embodiment of this application, for the terminal devices of at least two bandwidth types, the access network device generates the SSB, where the PBCH included in the SSB broadcast by the access network device may be multiplexed in frequency domain, to reduce transmission resources used to broadcast the SSB as much as possible.

Figure 13:
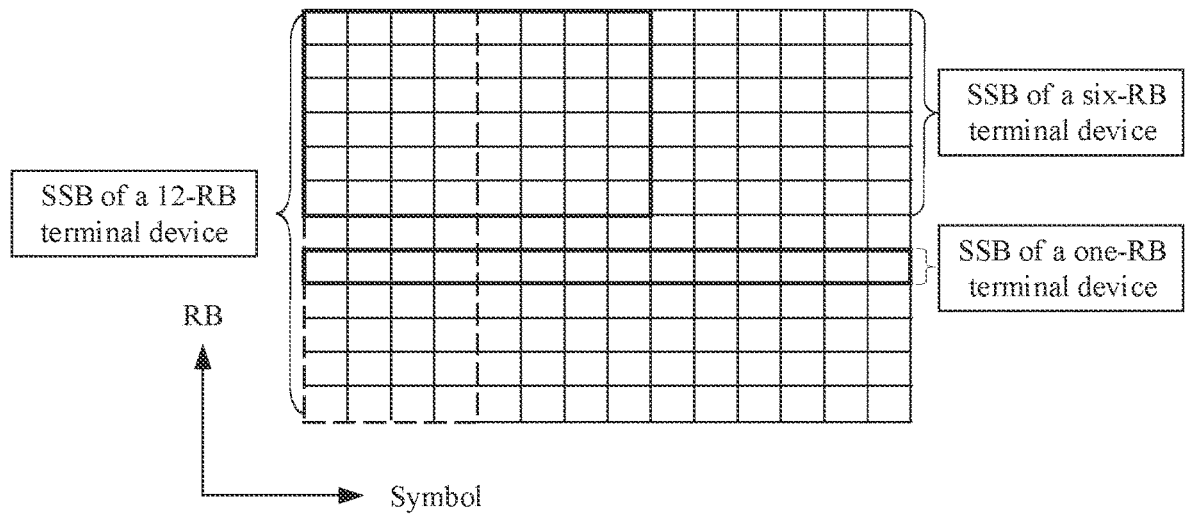
FIG. 13 is a schematic structural diagram of an SSB according to an embodiment of this application.

In a possible implementation, the frequency domain resource occupied by the SSB of the narrowband terminal device is located in the frequency domain resource occupied by the SSB of the broadband terminal device. For example, FIG. 13 is a schematic diagram of an SSB. In FIG. 13, an example in which there are terminal devices of three bandwidth types is used, where the terminal devices of three bandwidth types are, for example, a 12-RB terminal device, a six-RB terminal device and a one-RB terminal device. An access network device broadcasts the SSB, where the SSB is used by a terminal device whose bandwidth is $BW_1$, a terminal device whose bandwidth is $BW_2$, and a terminal device whose bandwidth is $BW_3$ to access a network. It is assumed that $BW_1 < BW_2 < BW_3$, that is, the terminal device whose bandwidth is $BW_1$ is the one-RB terminal device, the terminal device whose bandwidth is $BW_2$ is the six-RB terminal device, and the terminal device whose bandwidth is $BW_3$ is the 12-RB terminal device. In this case, a total bandwidth occupied by the SSB is $BW_3$, namely, 12 RBs. It can be learned from FIG. 13 that a frequency domain resource occupied by an SSB of the one-RB terminal device is located in a frequency domain resource occupied by an SSB of the 12-RB terminal device, and a frequency domain resource occupied by an SSB of the six-RB terminal device is also located in the frequency domain resource occupied by the SSB of the 12-RB terminal device. Compared with that the SSBs respectively corresponding to the 12-RB terminal device, the six-RB terminal device, and the one-RB terminal device are separately sent on different frequency bands, that is, the frequency domain resources occupied by the SSBs respectively corresponding to the 12-RB terminal device, the six-RB terminal device, and the one-RB terminal device have no intersection in frequency domain, in this embodiment of this application, SSBs of terminal devices of a plurality of bandwidth types are multiplexed on frequency domain resources, thereby reducing resources occupied by the SSBs.

In a possible implementation, when there are terminal devices of at least three bandwidth types, a frequency domain resource occupied by an SSB of a terminal device whose bandwidth is a first bandwidth is located in a frequency domain resource occupied by an SSB of a terminal device whose bandwidth is a second bandwidth, and the frequency domain resource occupied by the SSB of the terminal device whose bandwidth is the second bandwidth is located in a frequency domain resource occupied by an SSB of a terminal device whose bandwidth is a third bandwidth. The first bandwidth is less than the second bandwidth, and the second bandwidth is less than the third bandwidth.

Figure 14:
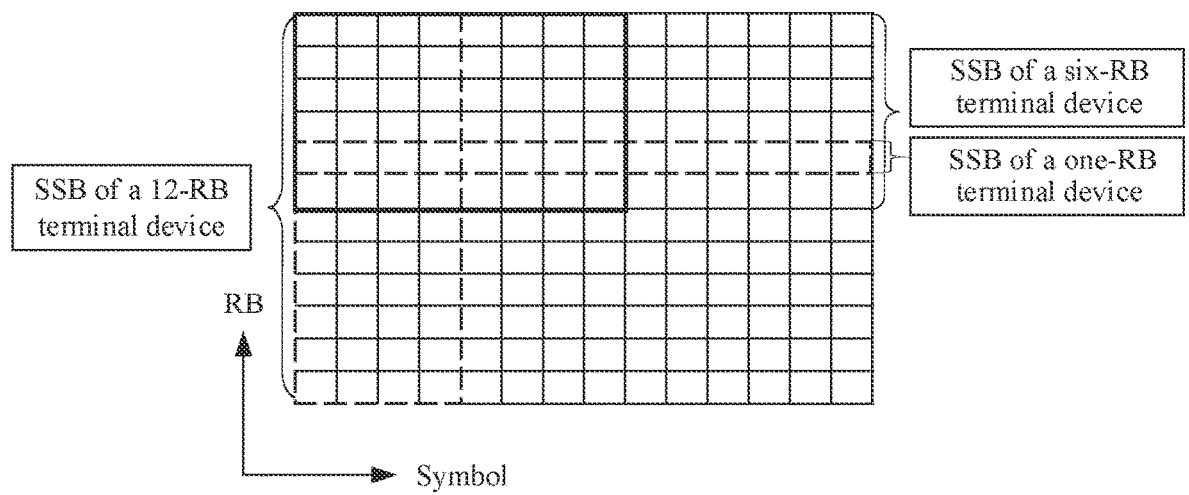
FIG. 14 is a schematic structural diagram of an SSB according to an embodiment of this application.

For example, FIG. 14 is a schematic diagram of an SSB. FIG. 14 still uses an example of a network system including terminal devices of three bandwidth types, including a 12-RB terminal device, a six-RB terminal device, and a one-RB terminal device. An access network device broadcasts the SSB, where the SSB is used by a terminal device whose bandwidth is a first bandwidth ($BW_1$), a terminal device whose bandwidth is a second bandwidth ($BW_2$), and a terminal device whose bandwidth is a third bandwidth ($BW_3$) to access a network. For example, the terminal device whose bandwidth is $BW_1$ is the one-RB terminal device, the terminal device whose bandwidth is $BW_2$ is the six-RB terminal device, and the terminal device whose bandwidth is $BW_3$ is the 12-RB terminal device. There is a nesting relationship between $BW_1$ and $BW_2$, and between $BW_2$ and $BW_3$. That is, $BW_1$ is included in $BW_2$, $BW_2$ is included in $BW_3$, and the rest can be deduced by analogy. It can be learned from FIG. 14 that a frequency domain resource occupied by an SSB of the one-RB terminal device is located in a frequency domain resource occupied by an SSB of the six-RB terminal device, and the frequency domain resource occupied by the SSB of the six-RB terminal device is located in a frequency domain resource occupied by an SSB of the 12-RB terminal device, to further reduce resources occupied by the SSBs.

For ease of understanding, the following uses an example of a communication system including a one-RB terminal device, a six-RB terminal device, and a 12-RB terminal device, to describe a possible structure of the foregoing SSB by using a relatively specific example.

Figure 15:
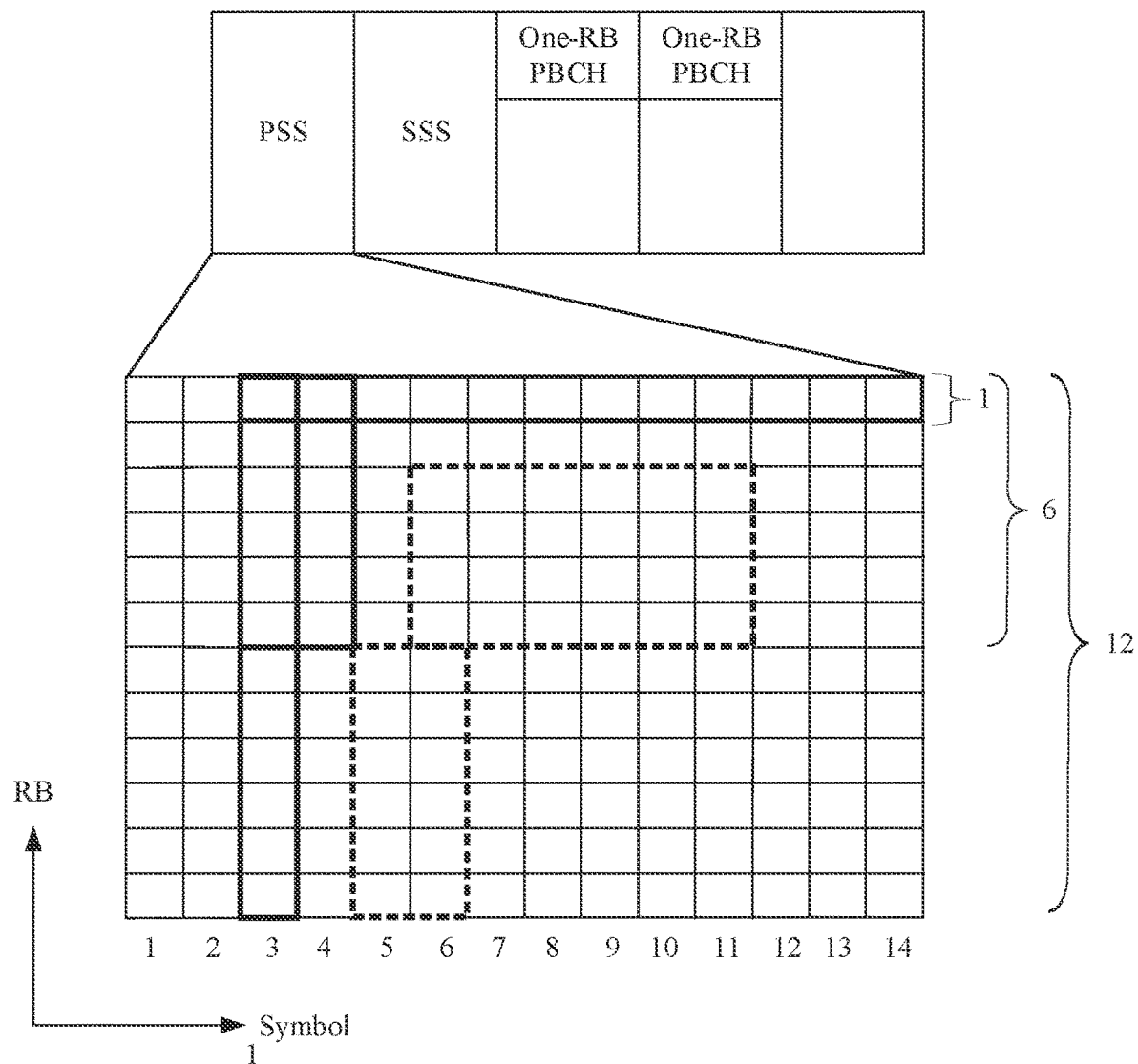
FIG. 15 is a schematic structural diagram of an SSB according to an embodiment of this application.

For example, FIG. 15 is a schematic diagram of an SSB. The SSB includes a PSS, an SSS, and PBCHs. The SSB shown in FIG. 15 occupies four slots in time domain in total, and occupies 12 RBs in frequency domain in total. Parts of the SSB in the 3$^{rd}$ slot and the 4$^{th}$ slot include only a PBCH applicable to a one-RB terminal device. Therefore, the SSB occupies only one RB in the 3$^{rd}$ slot and the 4$^{th}$ slot FIG. 15 is an example of the embodiments in FIG. 13 and FIG. 14. In FIG. 15, from left to right, a PSS and an SSS (which are also referred to as an SS in the following) included in an SSB of a 12-RB terminal device occupy the 3$^{rd}$ symbol in time domain, occupy 12 RBs in frequency domain, and are represented by using a dashed-line box; SSs included in an SSB of a six-RB terminal device occupy the 3$^{rd}$ symbol and the 4$^{th}$ symbol in time domain, occupy six RBs in frequency domain, and are represented by using a solid-line box; SSs included in an SSB of the one-RB terminal device occupy the 3$^{rd}$ symbol to the 14$^{th}$ symbol in time domain, occupy one RB in frequency domain, and are represented by using a solid-line box; a PBCH (the foregoing fourth PBCH) included in the SSB of the 12-RB terminal device occupies the 5$^{th}$ symbol and the 6$^{th}$ symbol in time domain, occupies six RBs in frequency domain, and is represented by using a dashed-line box; and a PBCH (the foregoing first PBCH) included in the SSB of the 12-RB terminal device or the six-RB terminal device occupies the 6$^{th}$ symbol to the 11$^{th}$ symbol in time domain, occupies four RBs in frequency domain, and is represented by using a dashed-line box.

In the first two slots in the four slots, the first two symbols in each slot are reserved for the broadband terminal device to send a PDCCH, and SSs of the narrowband terminal device start from the 3$^{rd}$ symbol. SSs of terminal devices of different bandwidth types occupy different bandwidths, but sequences carried by the terminal devices of different bandwidth types may be a same sequence.

The frequency domain resource occupied by the PBCH of the six-RB terminal device is the same as a frequency domain resource occupied by the SSs. In addition, a guard interval is reserved to avoid interference caused by the one-RB SS, for example, the 1-RB SS to the PBCH of the six-RB terminal device. For example, the 5$^{th}$ symbol between the 4$^{th}$ symbol and the 6$^{th}$ symbol in FIG. 15 is reserved as the guard interval.

The frequency domain resource occupied by the fourth PBCH of the 12-RB terminal device is on a frequency band of the 12-RB terminal device, and is located outside a frequency band of the six-RB terminal device. In this case, the one-RB terminal device and the six-RB terminal device obtain synchronization information such as an SIB by detecting respective PBCHs, and the 12-RB terminal device obtains the synchronization information such as the SIB by detecting the first PBCH of the six-RB terminal device and the fourth PBCH of the 12-RB terminal device.

S703: The terminal device obtains a PBCH based on a received first signal, to perform synchronization processing, where the first signal includes the PBCH, the PBCH is located in the synchronization signal block SSB, the SSB includes the first PBCH and the second PBCH, the first PBCH carries the time-frequency resource position information of the first synchronization information, and the second PBCH carries the time-frequency resource position information of the second synchronization information, the time-frequency resource position of the first synchronization information and the time-frequency resource position of the second synchronization information are different, and the obtained PBCH is the first PBCH or the second PBCH.

The access network device sends the same SSB for the terminal devices of various bandwidth types. The terminal devices of different bandwidth types obtain corresponding PBCHs based on the received SSB, to obtain synchronization information based on time-frequency resource position information that is carried by the PBCHs and that is of the synchronization information, and perform synchronization. Both the broadband terminal device and the narrowband terminal device receive the first signal from the access network device. The first signal herein may be the SSB, or may be a signal from which the SSB may be obtained. The broadband terminal device and the narrowband terminal device obtain the SSB based on the first signal, and obtain the PBCH from the SSB, to perform synchronization.

In this embodiment of this application, the SSB may include the first PBCH and the second PBCH. The first PBCH may carry the first synchronization information, for example, time-frequency resource position information of the first SIB1, and the second PBCH may carry the second synchronization information, for example, time-frequency resource position information of the second SIB1. The first SIB1 may be used by, for example, the broadband terminal device to perform synchronization, and the second SIB1 may be used by, for example, the narrowband terminal device to perform synchronization. Therefore, the broadband terminal device and the narrowband terminal device may separately obtain the corresponding PBCH from the SSB, and further obtain the synchronization information based on the obtained PBCH, to perform synchronization. The following separately describes how the terminal device performs synchronization based on the obtained SSB by using examples in which the terminal device is a broadband terminal device and a narrowband terminal device.

For example, the terminal device is the broadband terminal device. After obtaining the SSB, the broadband terminal device may obtain the first PBCH from the SSB, parse the first PBCH, and obtain the time-frequency resource position information of the first SIB1, to obtain the first SIB1 based on the time-frequency resource position information of the first SIB1 and perform synchronization.

For example, the terminal device is the narrowband terminal device. After obtaining the SSB, the narrowband terminal device may obtain the second PBCH from the SSB. The second PBCH carries the time-frequency resource position information of the second SIB1, for example, the second PBCH carries the CRB offset of the second SIB, so that the narrowband terminal device can learn, by parsing the second PBCH, the position at which the second SIB1 is received, to perform synchronization based on the second SIB1.

The following separately describes, by using specific examples, procedures in which the broadband terminal device and the narrowband terminal device obtain the PBCH and obtain the SIB based on the PBCH.

Continuing to refer to FIG. 8, an example in which the broadband terminal device is the legacy terminal device, and the narrowband terminal device is the mMTC terminal device is used. If time-frequency resource position information of an SIB1 indicates a PDCCH of 24 RBs, the legacy terminal device may receive information within 24 RBs, so that after receiving the SSB, the legacy terminal device may obtain the first PBCH from the SSB, and further obtain the first SIB1 based on an indication of the time-frequency resource position information that is carried on the first PBCH and that is of the first SIB1. However, because the mMTC terminal device can receive information within 25 RBs, the mMTC terminal device may receive the SIB1 from the PDCCH of 24 RBs. In this case, the time-frequency resource position of the second SIB1 and the time-frequency resource position of the first SIB1 may be the same. In addition, the mMTC terminal device receives the second SIB1 from the PDCCH of 24 RBs based on an indication of the time-frequency resource position information that is carried on the second PBCH in the SSB and that is of the second SIB1.

If time-frequency resource position information of an SIB indicates a PDCCH of 48 RBs, the mMTC terminal device receives the second PBCH that belongs to the mMTC terminal device and that is in the SSB of the legacy terminal device. In this case, the time-frequency resource position information that is carried on the second PBCH and that is of the second SIB1 indicates a position at which the mMTC terminal device can receive the second SIB1. For example, continuing to refer to FIG. 9, FIG. 9 shows the second PBCH belonging to the mMTC terminal device, namely, the NB-PBCH. The NB-PBCH is used to update, for the mMTC terminal device, a part of information in the PBCH of the legacy terminal device, for example, the time-frequency resource position information of the second SIB. In a possible implementation, the time-frequency resource position information that is carried on the second PBCH and that is of the second SIB1 indicates that the second SIB1 is transmitted on 24 RBs, so that the mMTC terminal device may obtain the second SIB1 on the 24 RBs based on an indication of the second PBCH, to perform downlink synchronization.

The following describes, with reference to the accompanying drawings, apparatuses configured to implement the foregoing method in the embodiments of this application. Therefore, all the foregoing content may be used in subsequent embodiments, and repeated content is not described again.

Figure 16:
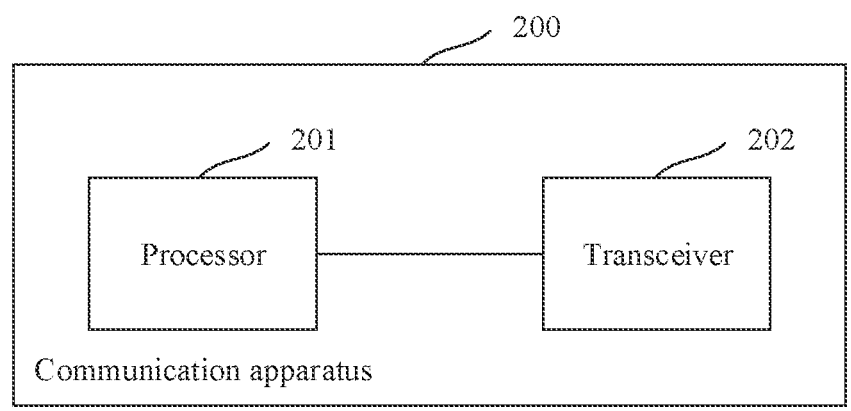
FIG. 16 is a schematic diagram of a communication apparatus that can implement a function of an access network device according to an embodiment of this application.

FIG. 16 is a schematic structural diagram of a communication apparatus 200. The communication apparatus 200 may implement functions of the access network device described above. The communication apparatus 200 may be the access network device described above, or may be a chip disposed in the access network device described above. The communication apparatus 200 may include a processor 201 and a transceiver 202. The processor 201 may be configured to perform S701 in the embodiment shown in FIG. 7, and/or support another procedure of the technology described in this specification, for example, may perform all or some of the procedures performed by the access network device other than the receiving and sending procedures described above. The transceiver 202 may be configured to: perform S702 in the embodiment shown in FIG. 7, and/or support another procedure of the technology described in this specification, for example, may perform all or some of the foregoing receiving and sending procedures performed by the access network device.

For example, the processor 201 is configured to generate a synchronization signal block SSB, where the SSB includes a first PBCH and a second PBCH, the first PBCH carries time-frequency resource position information of first synchronization information, the second PBCH carries time-frequency resource position information of second synchronization information, and a time-frequency resource position of the first synchronization information is different from a time-frequency resource position of the second synchronization information.

The transceiver 202 is configured to broadcast the SSB.

In a possible implementation, the first PBCH carries third synchronization information, the time-frequency resource position information of the first synchronization information and the third synchronization information are used by a first-type terminal device to perform downlink synchronization, and the time-frequency resource position information of the second synchronization information and the third synchronization information are used by a second-type terminal device to perform downlink synchronization.

In a possible implementation, the first synchronization information is a first system information block type 1 SIB1, and the second synchronization information is a second SIB1.

The time-frequency resource position information that is carried on the second PBCH and that is of the second synchronization information is position information of the second SIB1 and/or a carrier resource block CRB offset, and the CRB offset is used to indicate the position information of the second SIB1.

In a possible implementation, the first SIB1 and the second SIB1 include same or different information.

In a possible implementation, the SSB further includes a third PBCH.

A frequency domain resource of the first PBCH is a first frequency domain resource, a frequency domain resource of the third PBCH is a third frequency domain resource, and the first frequency domain resource includes a second frequency domain resource and the third frequency domain resource.

Information carried on the third PBCH is the same as information carried on the first PBCH on the second frequency domain resource, or a signal carried on the third PBCH is the same as a signal carried on the first PBCH on the second frequency domain resource.

In a possible implementation, the transceiver 202 is specifically configured to broadcast the SSB on same frequency domain resources within at least one time window.

In a possible implementation, a maximum bandwidth of the second-type terminal device is less than or equal to a maximum bandwidth of the first-type terminal device.

All related content of the steps in the foregoing method embodiments may be cited in function descriptions of a corresponding functional module. Details are not described herein again.

Figure 17:
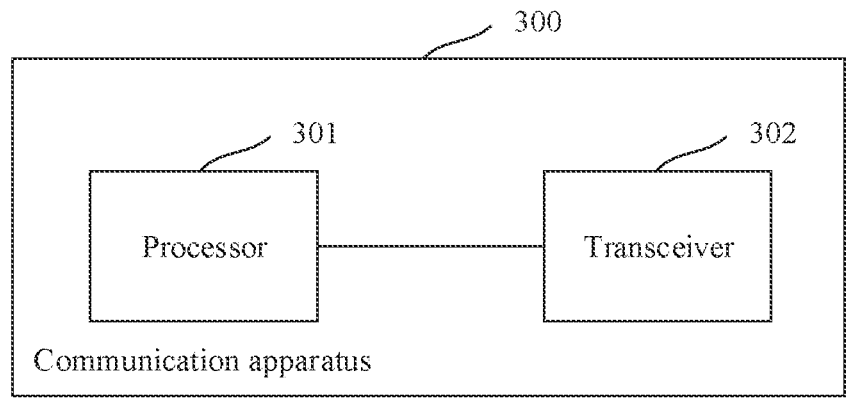
FIG. 17 is a schematic diagram of a communication apparatus that can implement a function of a terminal device according to an embodiment of this application.

FIG. 17 is a schematic structural diagram of a communication apparatus 300. The communication apparatus 300 may implement functions of the terminal described above. The communication apparatus 300 may be the terminal device described above, or may be a chip disposed in the terminal device described above. The communication apparatus 300 may include a processor 301 and a transceiver 302. The processor 301 may be configured to: perform S703 in the embodiment shown in FIG. 7, and/or support another procedure of the technology described in this specification, for example, may perform all or some of the procedures performed by the terminal device other than the receiving and sending procedures described above. The transceiver 302 may be configured to: perform S703 in the embodiment shown in FIG. 7, and/or support another procedure of the technology described in this specification, for example, may perform all or some of the foregoing receiving and sending procedures performed by the terminal device.

For example, the transceiver 302 is configured to receive a first signal, where the first signal includes a PBCH.

The processor 301 is configured to obtain the PBCH.

The PBCH is located in a synchronization signal block SSB, the SSB includes a first PBCH and a second PBCH, the first PBCH carries time-frequency resource position information of first synchronization information, the second PBCH carries time-frequency resource position information of second synchronization information, and a time-frequency resource position of the first synchronization information is different from a time-frequency resource position of the second synchronization information. The obtained PBCH is the first PBCH or the second PBCH.

In a possible implementation, the first PBCH carries third synchronization information, and the processor 301 is further configured to obtain the third synchronization information on the first PBCH, and perform synchronization processing based on the third synchronization information and the obtained PBCH.

In a possible implementation, when the obtained PBCH is the first PBCH, the terminal device is a first-type terminal device.

When the obtained PBCH is the second PBCH, the terminal device is a second-type terminal device.

A maximum bandwidth of the second-type terminal device is less than or equal to a maximum bandwidth of the first-type terminal device.

In a possible implementation, the first synchronization information is a first SIB1, and the second synchronization information is a second SIB1.

The time-frequency resource position information that is carried on the second PBCH and that is of the second synchronization information is position information of the second SIB1 and/or a CRB offset, and the CRB offset is used to indicate the position information of the second SIB1.

In a possible implementation, the first SIB1 and the second SIB1 include same or different information.

In a possible implementation, the SSB further includes a third PBCH.

A frequency domain resource of the first PBCH is a first frequency domain resource, a frequency domain resource of the third PBCH is a third frequency domain resource, and the first frequency domain resource includes a second frequency domain resource and the third frequency domain resource.

Information carried on the third PBCH is the same as information carried on the first PBCH on the second frequency domain resource, or a signal carried on the third PBCH is the same as a signal carried on the first PBCH on the second frequency domain resource.

In a possible implementation, the transceiver 302 is specifically configured to receive the first signal within at least one time window.

All related content of the steps in the foregoing method embodiments may be cited in function descriptions of a corresponding functional module. Details are not described herein again.

Figure 18A:
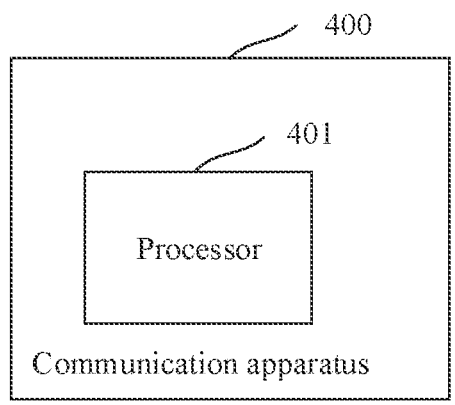
FIG. 18A and FIG. 18B are two schematic diagrams of a communication apparatus according to an embodiment of this application.

In a simple embodiment, a person skilled in the art can figure out that the communication apparatus 200 or the communication apparatus 300 may alternatively be implemented by using a structure of a communication apparatus 400 shown in FIG. 18A. The communication apparatus 400 may implement functions of the terminal device or the access network device described above. The communication apparatus 400 may include a processor 401.

When the communication apparatus 400 is configured to implement the functions of the access network device described above, the processor 401 may be configured to: perform S701 in the embodiment shown in FIG. 7, and/or support another procedure of the technology described in this specification, for example, may perform all or some of the procedures performed by the access network device other than the receiving and sending procedures described above. Alternatively, when the communication apparatus 400 is configured to implement a function of the terminal device described above, the processor 401 may be configured to: perform S703 in the embodiment shown in FIG. 7, and/or support another procedure of the technology described in this specification, for example, may perform all or some of the procedures performed by the terminal device other than the receiving and sending procedures described above.

The communication apparatus 400 may be implemented by using a field programmable gate array (field-programmable gate array, FPGA), an application-specific integrated circuit (application specific integrated circuit, ASIC), a system on a chip (system on chip, SoC), a central processing unit (central processor unit, CPU), a network processor (network processor, NP), a digital signal processor (digital signal processor, DSP), a micro controller unit (micro controller unit, MCU), a programmable controller (programmable logic device, PLD), or another integrated chip. The communication apparatus 400 may be disposed in the access network device or the terminal device in the embodiments of this application, so that the access network device or the terminal device implements the method provided in the embodiments of this application.

In an optional implementation, the communication apparatus 400 may include a transceiver component, configured to communicate with another device. When the communication apparatus 400 is configured to implement the functions of the access network device or the terminal device described above, the transceiver component may be configured to: perform S702 in the embodiment shown in FIG. 7, and/or support another procedure of the technology described in this specification. For example, the transceiver component is a communication interface. If the communication apparatus 400 is an access network device or a terminal device, the communication interface may be a transceiver in the access network device or the terminal device, for example, the transceiver 202 or the transceiver 302. The transceiver is, for example, a radio frequency transceiver component in the access network device or the terminal device. Alternatively, if the communication apparatus 400 is a chip disposed in an access network device or a terminal device, the communication interface may be an input/output interface of the chip, for example, an input/output pin.

Figure 18B:
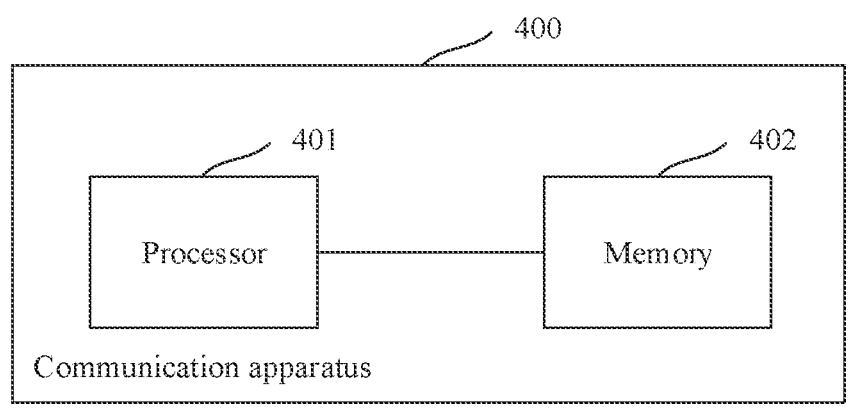

In an optional implementation, the communication apparatus 400 may further include a memory 402. Referring to FIG. 18B, the memory 402 is configured to store computer programs or instructions, and the processor 401 is configured to decode and execute the computer programs or the instructions. It should be understood that these computer programs or instructions may include function programs of the foregoing access network device or the foregoing terminal device. When the function programs of the access network device are decoded and executed by the processor 401, the access network device is enabled to implement a function of the access network device in the method provided in the embodiment shown in FIG. 7 in the embodiments of this application. When the function programs of the terminal device are decoded and executed by the processor 401, the terminal device may be enabled to implement a function of the terminal device in the method provided in the embodiment shown in FIG. 7 in the embodiments of this application.

In another optional implementation, these function programs of the access network device or the terminal device are stored in an external memory of the communication apparatus 400. When the function programs of the access network device are decoded and executed by the processor 401, the memory 402 temporarily stores a part or all of content of the function programs of the access network device. When the function programs of the terminal device are decoded and executed by the processor 401, the memory 402 temporarily stores a part or all of content of the function programs of the terminal device.

In another optional implementation, these function programs of the access network device or the terminal device are stored in the internal memory 402 of the communication apparatus 400. When the internal memory 402 of the communication apparatus 400 stores the function programs of the access network device, the communication apparatus 400 may be disposed in the access network device in the embodiments of this application. When the internal memory 402 of the communication apparatus 400 stores the function programs of the terminal device, the communication apparatus 400 may be disposed in the terminal device in the embodiments of this application.

In still another optional implementation, a part of content of the function programs of the access network device is stored in an external memory of the communication apparatus 400, and other content of the function programs of the access network device is stored in the internal memory 402 of the communication apparatus 400. Alternatively, a part of content of the function programs of the terminal device is stored in an external memory of the communication apparatus 400, and other content of the function programs of the terminal device is stored in the internal memory 402 of the communication apparatus 400.

In the embodiments of this application, the communication apparatus 200, the communication apparatus 300, and the communication apparatus 400 are presented in a form in which each functional module is divided for each function, or may be presented in a form in which each functional module is divided in an integrated manner. The "module" herein may be an ASIC, a processor and a memory that execute one or more software or firmware programs, an integrated logic circuit, and/or another component that can provide the foregoing functions.

In addition, the communication apparatus 200 provided in the embodiment shown in FIG. 16 may alternatively be implemented in another form. For example, the communication apparatus includes a processing module and a transceiver module. For example, the processing module may be implemented by using the processor 201, and the transceiver module may be implemented by using the transceiver 202. The processing module may be configured to: perform S701 in the embodiment shown in FIG. 7, and/or support another procedure of the technology described in this specification, for example, may perform all or some of the procedures performed by the access network device other than the receiving and sending procedures described above. The transceiver module may be configured to: perform S702 in the embodiment shown in FIG. 7, and/or support another procedure of the technology described in this specification, for example, may perform all or some of the foregoing receiving and sending procedures performed by the access network device.

For example, the processing module is configured to generate a synchronization signal block SSB, where the SSB includes a first PBCH and a second PBCH, the first PBCH carries time-frequency resource position information of first synchronization information, the second PBCH carries time-frequency resource position information of second synchronization information, and a time-frequency resource position of the first synchronization information is different from a time-frequency resource position of the second synchronization information.

The transceiver module is configured to broadcast the SSB.

In a possible implementation, the first PBCH carries third synchronization information, the time-frequency resource position information of the first synchronization information and the third synchronization information are used by a first-type terminal device to perform downlink synchronization, and the time-frequency resource position information of the second synchronization information and the third synchronization information are used by a second-type terminal device to perform downlink synchronization.

In a possible implementation, the first synchronization information is a first system information block type 1 SIB1, and the second synchronization information is a second SIB1.

The time-frequency resource position information that is carried on the second PBCH and that is of the second synchronization information is position information of the second SIB1 and/or a carrier resource block CRB offset, and the CRB offset is used to indicate the position information of the second SIB1.

In a possible implementation, the first SIB1 and the second SIB1 include same or different information.

In a possible implementation, the SSB further includes a third PBCH.

A frequency domain resource of the first PBCH is a first frequency domain resource, a frequency domain resource of the third PBCH is a third frequency domain resource, and the first frequency domain resource includes a second frequency domain resource and the third frequency domain resource.

Information carried on the third PBCH is the same as information carried on the first PBCH on the second frequency domain resource, or a signal carried on the third PBCH is the same as a signal carried on the first PBCH on the second frequency domain resource.

In a possible implementation, the transceiver module is specifically configured to broadcast the SSB on same frequency domain resources within at least one time window.

In a possible implementation, a maximum bandwidth of the second-type terminal device is less than or equal to a maximum bandwidth of the first-type terminal device.

All related content of the steps in the foregoing method embodiments may be cited in function descriptions of a corresponding functional module. Details are not described herein again.

The communication apparatus 300 provided in the embodiment shown in FIG. 17 may alternatively be implemented in another form. For example, the communication apparatus includes a processing module and a transceiver module. For example, the processing module may be implemented by using the processor 301, and the transceiver module may be implemented by using the transceiver 302. The processing module may be configured to: perform S703 in the embodiment shown in FIG. 7, and/or support another procedure of the technology described in this specification, for example, may perform all or some of the procedures performed by the terminal device other than the receiving and sending procedures described above. The transceiver module may be configured to: perform S703 in the embodiment shown in FIG. 7, and/or support another procedure of the technology described in this specification, for example, may perform all or some of the foregoing receiving and sending procedures performed by the terminal device.

For example, the transceiver module is configured to receive a first signal, where the first signal includes a physical broadcast channel PBCH.

The processing module is configured to obtain the PBCH.

The PBCH is located in a synchronization signal block SSB, the SSB includes a first PBCH and a second PBCH, the first PBCH carries time-frequency resource position information of first synchronization information, the second PBCH carries time-frequency resource position information of second synchronization information, and a time-frequency resource position of the first synchronization information is different from a time-frequency resource position of the second synchronization information. The obtained PBCH is the first PBCH or the second PBCH.

In a possible implementation, the first PBCH carries third synchronization information, and the processing module is further configured to obtain the third synchronization information on the first PBCH, and perform synchronization processing based on the third synchronization information and the obtained PBCH.

In a possible implementation, when the obtained PBCH is the first PBCH, the terminal device is a first-type terminal device.

When the obtained PBCH is the second PBCH, the terminal device is a second-type terminal device.

A maximum bandwidth of the second-type terminal device is less than or equal to a maximum bandwidth of the first-type terminal device.

In a possible implementation, the first synchronization information is a first SIB1, and the second synchronization information is a second SIB1.

The time-frequency resource position information that is carried on the second PBCH and that is of the second synchronization information is position information of the second SIB1 and/or a CRB offset, and the CRB offset is used to indicate the position information of the second SIB1.

In a possible implementation, the first SIB1 and the second SIB1 include same or different information.

In a possible implementation, the SSB further includes a third PBCH.

A frequency domain resource of the first PBCH is a first frequency domain resource, a frequency domain resource of the third PBCH is a third frequency domain resource, and the first frequency domain resource includes a second frequency domain resource and the third frequency domain resource.

Information carried on the third PBCH is the same as information carried on the first PBCH on the second frequency domain resource, or a signal carried on the third PBCH is the same as a signal carried on the first PBCH on the second frequency domain resource.

In a possible implementation, the transceiver module is specifically configured to receive the first signal within at least one time window.

All related content of the steps in the foregoing method embodiments may be cited in function descriptions of a corresponding functional module. Details are not described herein again.

The communication apparatus 200, the communication apparatus 300, and the communication apparatus 400 provided in the embodiments of this application may be configured to perform the method provided in the embodiment shown in FIG. 5. Therefore, for technical effects that can be achieved by the communication apparatus 200, the communication apparatus 300, and the communication apparatus 400, refer to the foregoing method embodiments. Details are not described herein again.

The embodiments of this application are described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. The computer program instructions may be provided for a general-purpose computer, a dedicated computer, an embedded processor, or a processor of another programmable data processing device to generate a machine, so that the instructions executed by a computer or the processor of the another programmable data processing device generate an apparatus for implementing a specified function in one or more processes in the flowcharts and/or in one or more blocks in the block diagrams.

All or some of the foregoing embodiments may be implemented by using software, hardware, firmware, or any combination thereof. When the embodiments are implemented by using software, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium, or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, wireless, or microwave) manner. The computer-readable storage medium may be any usable medium accessible by the computer, or a data storage device, s as a server or a data center, integrating one or more usable media. The usable medium may be a magnetic medium (for example, a floppy disk, a hard disk, or a magnetic tape), an optical medium (for example, a digital versatile disc (digital versatile disc, DVD)), a semiconductor medium (for example, a solid-state drive (solid state disk, SSD)), or the like.

It is clear that a person skilled in the art can make various modifications and variations to the embodiments of this application without departing from the spirit and scope of this application. This application is intended to cover these modifications and variations provided that they fall within the scope of protection defined by the following claims and their equivalent technologies.

What is claimed is:

1. A communication method, wherein the method comprises:

generating, by an access network device, a synchronization signal block (SSB), wherein the SSB comprises a first physical broadcast channel (PBCH) and a second PBCH, the first PBCH carries time-frequency resource position information of first synchronization information, the second PBCH carries time-frequency resource position information of second synchronization information, and a time-frequency resource position of the first synchronization information is different from a time-frequency resource position of the second synchronization information; and broadcasting, by the access network device, the SSB.

2. The method according to claim 1, wherein the first PBCH carries third synchronization information, the time-frequency resource position information of the first synchronization information and the third synchronization information are used for downlink synchronization of a first-type terminal device, and the time-frequency resource position information of the second synchronization information and the third synchronization information are used for downlink synchronization of a second-type terminal device.

3. The method according to claim 1, wherein:
the first synchronization information is a first system information block type 1 (SIB1), and the second synchronization information is a second SIB1; and
the time-frequency resource position information that is carried on the second PBCH and that is of the second synchronization information is at least one of position information of the second SIB1 or a carrier resource block (CRB) offset, wherein the CRB offset is used to indicate the position information of the second SIB1.

4. The method according to claim 3, wherein the first SIB1 and the second SIB1 comprise same or different information.

5. The method according to claim 1, wherein:
the SSB further comprises a third PBCH; and
a frequency domain resource of the first PBCH is a first frequency domain resource, a frequency domain resource of the third PBCH is a third frequency domain resource, and the first frequency domain resource comprises a second frequency domain resource and the third frequency domain resource, wherein:
information carried on the third PBCH is the same as information carried on the first PBCH on the second frequency domain resource; or
a signal carried on the third PBCH is the same as a signal carried on the first PBCH on the second frequency domain resource.

6. A communication method, wherein the method comprises:
receiving, by a terminal device, a first signal, wherein the first signal comprises a physical broadcast channel (PBCH); and
obtaining, by the terminal device, the PBCH, wherein:
the PBCH is located in a synchronization signal block (SSB), the SSB comprises a first PBCH and a second PBCH, the first PBCH carries time-frequency resource position information of first synchronization information, the second PBCH carries time-frequency resource position information of second synchronization information, and a time-frequency resource position of the first synchronization information is different from a time-frequency resource position of the second synchronization information; and
the PBCH is the first PBCH or the second PBCH.

7. The method according to claim 6, wherein the first PBCH carries third synchronization information, and the method further comprises:
obtaining, by the terminal device, the third synchronization information on the first PBCH; and
performing, by the terminal device, synchronization processing based on the third synchronization information and the PBCH.

8. The method according to claim 6, wherein:
when the PBCH is the first PBCH, the terminal device is a first-type terminal device; and
when the PBCH is the second PBCH, the terminal device is a second-type terminal device, wherein:
a maximum bandwidth supported by the second-type terminal device is less than or equal to a maximum bandwidth supported by the first-type terminal device.

9. The method according to claim 6, wherein:
the first synchronization information is a first system information block type 1 (SIB1), and the second synchronization information is a second SIB1; and
the time-frequency resource position information that is carried on the second PBCH and that is of the second synchronization information is at least one of position information of the second SIB1 or a carrier resource block (CRB) offset, wherein the CRB offset is used to indicate the position information of the second SIB1.

10. The method according to claim 9, wherein the first SIB1 and the second SIB1 comprise same or different information.

11. An apparatus, comprising:
at least one processor;
one or more memories coupled to the at least one processor and storing programming instructions for execution by the at least one processor to:
generate a synchronization signal block (SSB), wherein the SSB comprises a first PBCH and a second PBCH, the first PBCH carries time-frequency resource position information of first synchronization information, the second PBCH carries time-frequency resource position information of second synchronization information, and a time-frequency resource position of the first synchronization information is different from a time-frequency resource position of the second synchronization information; and
a transceiver, configured to broadcast the SSB.

12. The apparatus according to claim 11, wherein the first PBCH carries third synchronization information, the time-frequency resource position information of the first synchronization information and the third synchronization information are used by a first-type terminal device to perform downlink synchronization, and the time-frequency resource position information of the second synchronization information and the third synchronization information are used by a second-type terminal device to perform downlink synchronization.

13. The apparatus according to claim 11, wherein:
the first synchronization information is a first system information block type 1 (SIB1), and the second synchronization information is a second SIB1; and
the time-frequency resource position information that is carried on the second PBCH and that is of the second synchronization information is at least one of position information of the second SIB1 or a carrier resource block (CRB) offset, wherein the CRB offset is used to indicate the position information of the second SIB1.

14. The apparatus according to claim 13, wherein the first SIB1 and the second SIB1 comprise same or different information.

15. The apparatus according to claim 11, wherein:
the SSB further comprises a third PBCH; and
a frequency domain resource of the first PBCH is a first frequency domain resource, a frequency domain resource of the third PBCH is a third frequency domain resource, and the first frequency domain resource comprises a second frequency domain resource and the third frequency domain resource, wherein:

information carried on the third PBCH is the same as information carried on the first PBCH on the second frequency domain resource; or a signal carried on the third PBCH is the same as a signal carried on the first PBCH on the second frequency domain resource.

16. An apparatus, comprising:

a transceiver, configured to receive a first signal, wherein the first signal comprises a physical broadcast channel (PBCH);

at least one processor; and one or more memories coupled to the at least one processor and storing programming instructions for execution by the at least one processor to: obtain the PBCH, wherein:

the PBCH is located in a synchronization signal block (SSB), the SSB comprises a first PBCH and a second PBCH, the first PBCH carries time-frequency resource position information of first synchronization information, the second PBCH carries time-frequency resource position information of second synchronization information, and a time-frequency resource position of the first synchronization information is different from a time-frequency resource position of the second synchronization information; and the PBCH is the first PBCH or the second PBCH.

17. The apparatus according to claim 16, wherein:

the first PBCH carries third synchronization information; and the one or more memories store the programming instructions for execution by the at least one processor to:

obtain the third synchronization information on the first PBCH; and perform synchronization processing based on the third synchronization information and the PBCH.

18. The apparatus according to claim 16, wherein:

when the obtained PBCH is the first PBCH, the apparatus is a first-type terminal device; and when the obtained PBCH is the second PBCH, the apparatus is a second-type terminal device, wherein:

a maximum bandwidth supported by the second-type terminal device is less than or equal to a maximum bandwidth supported by the first-type terminal device.

19. The apparatus according to claim 16, wherein:

the first synchronization information is a first system information block type 1 (SIB1), and the second synchronization information is a second SIB1; and the time-frequency resource position information that is carried on the second PBCH and that is of the second synchronization information is at least one of position information of the second SIB1 or a carrier resource block (CRB) offset, wherein the CRB offset is used to indicate the position information of the second SIB1.

20. The apparatus according to claim 19, wherein the first SIB1 and the second SIB1 comprise same or different information.

* * * * *